(12) United States Patent
Zelenkov

(10) Patent No.: US 10,261,989 B2
(45) Date of Patent: *Apr. 16, 2019

(54) METHOD OF AND SYSTEM FOR MAPPING A SOURCE LEXICAL UNIT OF A FIRST LANGUAGE TO A TARGET LEXICAL UNIT OF A SECOND LANGUAGE

(71) Applicant: YANDEX EUROPE AG, Lucerne (CH)

(72) Inventor: Yury Grigorievich Zelenkov, Orekhovo-Zuevo (RU)

(73) Assignee: YANDEX EUROPE AG, Lucerne (CH)

( * ) Notice: Subject to any disclaimer, the term of this patent is extended or adjusted under 35 U.S.C. 154(b) by 162 days.

This patent is subject to a terminal disclaimer.

(21) Appl. No.: 15/607,557

(22) Filed: May 29, 2017

(65) Prior Publication Data
US 2018/0081870 A1    Mar. 22, 2018

(30) Foreign Application Priority Data

Sep. 20, 2016  (RU) ................................ 2016137529

(51) Int. Cl.
G06F 17/27    (2006.01)
G06F 17/28    (2006.01)

(52) U.S. Cl.
CPC ........ *G06F 17/277* (2013.01); *G06F 17/2827* (2013.01); *G06F 17/2845* (2013.01)

(58) Field of Classification Search
None
See application file for complete search history.

(56) References Cited

U.S. PATENT DOCUMENTS

| 8,688,690 | B2 | 4/2014 | Brdiczka et al. |
| 9,047,275 | B2 | 6/2015 | Parfentieva et al. |
| 9,213,694 | B2 | 12/2015 | Hieber et al. |
| 2015/0278197 | A1 | 10/2015 | Bogdanova et al. |

OTHER PUBLICATIONS (In Russian) Mikhailov, "Black cat in a dark room or is it possible to automate the search for the translated equivalents in the parallel corpus?", 2002, Alphabet: Philology collection, pp. 181-188.
(Continued)

*Primary Examiner* — Richa Mishra
(74) *Attorney, Agent, or Firm* — BCF LLP

(57) ABSTRACT

A method for mapping a source lexical unit in a first language with target lexical unit in a second language, the method comprising: acquiring a source digital text comprising a plurality of source sentences; parsing the plurality of source sentences into source lexical units; generating, for each of the one or more source lexical units a source context parameter; acquiring a target digital text comprising a plurality of target sentences; parsing the plurality of target sentences into target lexical units; generating for each one or more target lexical units, a target context parameter; selecting a first source lexical unit having a first source context parameter; comparing the first source context parameter with a plurality of target context parameters to determine a target context parameter having a lowest difference value; mapping the first source lexical unit with a first target lexical unit associated with the given target context parameter.

20 Claims, 19 Drawing Sheets

(56) References Cited

OTHER PUBLICATIONS (In English, with regard to the above) Translation retrieved on Google Translate on Jun. 9, 2017 of Mikhailov, "Black cat in a dark room or is it possible to automate the search for the translated equivalents in the parallel corpus?", 2002, Alphabet: Philology collection, pp. 181-188.
Kedrova et al., "Fragmentation of the proposals of the body of parallel texts", Moscow State Lomonosov University, http://www.academia.edu/2766915/ and English Abstract.
Lipatov et al., "Methods of Automation of Creating and Widening of Bilingual Dictionaries Using Parallel Text Corpora", http://www.dialog-21.ru/digests/dialog2006/materials/html/Lipatov.htm and English Abstract.
(In Russian) Dobrovolsky et al., "Corpus of parallel texts; architecture and possibilities of use", pp. 263-296.
(In English, with regard to the above) Explanation of the relevance of Dobrovolsky et al., "Corpus of parallel texts; architecture and possibilities of use", 6 pages.
Ji et al., "Mining Name Translations from Comparable Corpora by Creating Bilingual Information Networks", Computer Science Department, Queens College and the Graduate Center the City University of New York, New York, NY, 11367, USA.

| | 312 | 314 | 316 | ... |
|---|---|---|---|---|
| | 1 [1,4,5,7] | 0.7 [1,4,7,8] | 0 [2,3,8,9] | ... |
| | 0.5 [1,4,5,7] | 1 [1,4,7,8] | 0.1 [2,3,8,9] | ... |
| | 0 [1,4,5,7] | 0.2 [1,4,7,8] | 1 [2,3,8,9] | ... |
| | ⋮ | ⋮ | ⋮ | ⋮ |

FIG. 7

| 712 | |
|---|---|
| TARGET SENTANCE | LOCAL MINIMUM |
| 322 | 1214 |
| 324 | 1218 |
| 326 | 1220 |
| ... | ... |

METHOD OF AND SYSTEM FOR MAPPING A SOURCE LEXICAL UNIT OF A FIRST LANGUAGE TO A TARGET LEXICAL UNIT OF A SECOND LANGUAGE

CROSS-REFERENCE

The present application claims priority to Russian Patent Application No. 2016137529, filed Sep. 20, 2016, entitled "Method Of And System For Mapping A Source Lexical Unit Of A First Language To A Target Lexical Unit Of A Second Language" the entirety of which is incorporated herein.

FIELD

The present technology relates to systems and methods for processing a source digital text and a target digital text, the target digital text being a translation of the source digital text. More specifically, the systems and methods relate to mapping a source lexical unit of the source digital text to a target lexical unit of the target digital text, the second lexical unit being a translation of the source lexical unit.

BACKGROUND

With ever increasing access to the Internet by different communities around the world, the Internet contains an enormous amount of webpages in different languages. The increased number of users accessing or using web translations tool reflects the necessity of providing a user with adequate and high quality translations.

A parallel text is a text placed alongside its translation. Parallel text alignment is the identification of the corresponding fragments (such as sentences or portions thereof) of a source text in a translated text.

One conventional method of aligning texts is by applying heuristic rules, such as aligning sentences based on the punctuation marks and positioning of the sentences. Such method may not be sufficiently precise, for example, due to an original sentence being translated into two sentences and the positioning of the original sentence within the original text not necessarily reflecting the positioning of the corresponding translated sentence within the translated text.

Another conventional method is the use of a pre-constructed translation dictionary. However, the construction of the translation dictionary is expensive, time and computational resource intensive.

The article «ЧЕРНАЯ КОШКА в темной КОМНАТЕ ИЛИ МОЖНО ЛИ АВТОМАТИЗИРОВАТЬ ПОИСК ПЕРЕВОДНЫХ ЭКВИВАЛЕНТОВ В ПАРАЛЛЕЛЬНОМ КОРПУСЕ ТЕКСТОВ?" М. Н. Михайлов (В сб Алфавит : Филологический сборник Смоленск , 2002.—С. 181-188) (Translated as: *Black Cat in a Dark Room or Can we Automate Search of Translation Equivalents in a Parallel Corpus of Texts*, M. N. Mihaylov, Philological Compilation, Smolensk, 2002 c. 181-188) discloses a method of finding equivalents of words in parallel texts using co-occurrence of two words in a first language and a second language in known equivalent fragments.

U.S. Pat. No. 9,047,275 discloses a computer-implemented systems and methods align fragments of a first text with corresponding fragments of a second text, which is a translation of the first text. One preferred embodiment preliminarily divides the first and second texts into fragments; generates a hypothesis about the correspondence between the fragments of the first and second texts; performs a lexico-morphological analysis of the fragments using linguistic descriptions; performs a syntactic analysis of the fragments using linguistic descriptions and generates syntactic structures for the fragments; generates semantic structures for the fragments; and estimates the degree of correspondence between the semantic structures.

US2015/0278197 discloses a system and method for creating a comparable corpus by obtaining a set of source documents containing text, constructing language-independent semantic structures for at least one sentence of each of the texts in the source documents; determining universal similarity measures for groups of the source documents by comparing the constructed language-independent semantic structures of the texts in the source documents; identifying sets of similar documents based on the determined universal similarity measures for the groups of the source documents; and creating the comparable corpus based on the identified sets of similar documents.

SUMMARY

The present technology may ameliorate at least some deficiencies of the prior art with respect to the automatic generation of thesaurus.

Without wishing to be bound by any specific theory, embodiments of the present technology have been developed based on the developers' appreciation that by analyzing (i) the relationship between a given source lexical unit and other source lexical units (the source context parameter) and (ii) the relationship between a given target lexical unit, which is the translation of the given source lexical unit, and other target lexical units (the target context parameter), one can automatically identify which translated lexical unit corresponds to the original lexical unit. In other words automatic mapping the given source lexical unit to the given target lexical unit can be done by determining the similarity between the given source context parameter and the given target context parameter, thus avoiding the use of any form of dictionaries for mapping source lexical units to translated lexical units.

In accordance with a first broad aspect of the present technology, there is provided a computer-implemented method for mapping a source lexical unit of a source digital text in a first language with a corresponding target lexical unit of a target digital text in a second language, the target digital text being a translation of the source digital text, the method executable on a server, the method comprising: acquiring, by the server, an indication of the source digital text to be processed, the source digital text comprising a plurality of source sentences; parsing by the server, at least some of the plurality of source sentences into one or more source lexical units; generating, for each of the one or more source lexical units a source context parameter, the source context parameter comprising: a first set of source context dependent relation (CDR) values, each source CDR value representing a ratio of (i) a number of source sentences where the given source lexical unit and each one or more source lexical units co-occur to (ii) a total number of source sentences containing the given source lexical unit; and an indication of one or more source sentences in which each one or more source lexical units occur; acquiring, by the server, an indication of the target digital text to be processed, the target digital text comprising a plurality of target sentences; parsing by the server, at least some of the plurality of target sentences into one or more target lexical units;

generating, for each one or more target lexical units, a target context parameter, the target context parameter comprising: a first set of target CDR values, each target CDR value representing a ratio of (i) a number of target sentences where the given source lexical unit and each one or more target lexical units co-occur to (ii) a total number of target sentences containing the given target lexical unit; an indication of one or more target sentences in which each one or more target lexical units occur; selecting, a first source lexical unit, the first source lexical unit having a first source context parameter; comparing, by the server, the first source context parameter with a plurality of target context parameters to determine a given target context parameter having a lowest difference value; and mapping the first source lexical unit with a first target lexical unit, the first target lexical unit being associated with the given target context parameter having the lowest difference value.

In some implementations of the present method, parsing each of the plurality of source sentences and each of the plurality of target sentences comprises assigning a grammatical type to each word of both the source digital text and the target digital text; and the lexical unit is one of: a word, the word being determined based on its associated grammatical type; and a phrase, the phrase being a group of two or more words determined based on the associated grammatical type of one of the two or more words.

In some implementations of the present method, comparing the first source context parameter with a plurality of target context parameters to determine a given target context parameter having a lowest difference value comprises: selecting a first source sentence comprising the first source lexical unit; for each target sentence of the plurality of target sentences: comparing the first source context parameter with the one or more target context parameters associated with the one or more target lexical unit comprising the given target sentence to determine a local minimum value, the local minimum value indicative of a preliminary correspondence of the first source context parameter with the given target context parameter within the given target sentence; and based on the determined set of local minimum values, selecting the local minimum value being the lowest difference value.

In some implementations of the present method, the first source lexical unit and the first target lexical unit associated with the lowest difference value is a hypothesis of translation equivalence.

In some implementations of the present method, the method further comprises validating the hypothesis of translation equivalence by: generating, for each of the one or more source lexical units, a second set of source context independent relation (CIR) values, each source CIR value representing a ratio of (i) the number of common words between the given source lexical unit and each of the one or more source lexical units to (ii) the number of words of the given source lexical unit; generating, for each of the one or more target lexical units, a second set of target CIR values, each target CIR value representing a ratio of (i) the number of common words between the given target lexical unit and each of the one or more target lexical units to (ii) the number of words of the given target lexical unit; and determining that the similarity of the set of source CIR values associated with the first source lexical unit to the set of target CIR values associated with the first target lexical unit is above a predetermined threshold.

In some implementations of the present method, the method is further configured to map each source lexical unit with each target lexical unit and storing the mapping in a mapping database.

In some implementations of the present method, where upon completion of mapping each source lexical unit to each target lexical unit, the method further comprising mapping the first source sentence to a first target sentence, the first target sentence being a translation equivalent of the first source sentence, by: identifying a set of source lexical units comprising the first source sentence; acquiring, from the mapping database, a set of target lexical units corresponding to the set of source lexical units; and identifying the first target sentence comprising the set of target lexical units.

In some implementations of the present method, where upon determination that no target sentence comprises the set of target lexical units, determining a set of target sentences, the set of target sentences comprising two or more adjacent target sentences, comprising the set of target lexical units.

In some implementations of the present method, acquiring the indications of the source digital text and the target digital text comprises acquiring the indications of the source digital text and the target digital text from a dedicated memory device.

In some implementations of the present method, acquiring the indications of the source digital text and the target digital text comprises acquiring the indications of the source digital text and the target digital text from a text processing application, the text processing application having previously generated the target digital text in response to receiving the source digital text from an electronic device.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7 depicts a schematic illustration of the CDR matrix populated by the process of FIG. 6.

FIG. 16 depicts a schematic illustration of the process of FIG. 14.

It should also be noted that, unless otherwise explicitly specified herein, the drawings are not to scale.

DETAILED DESCRIPTION

Figure 1:
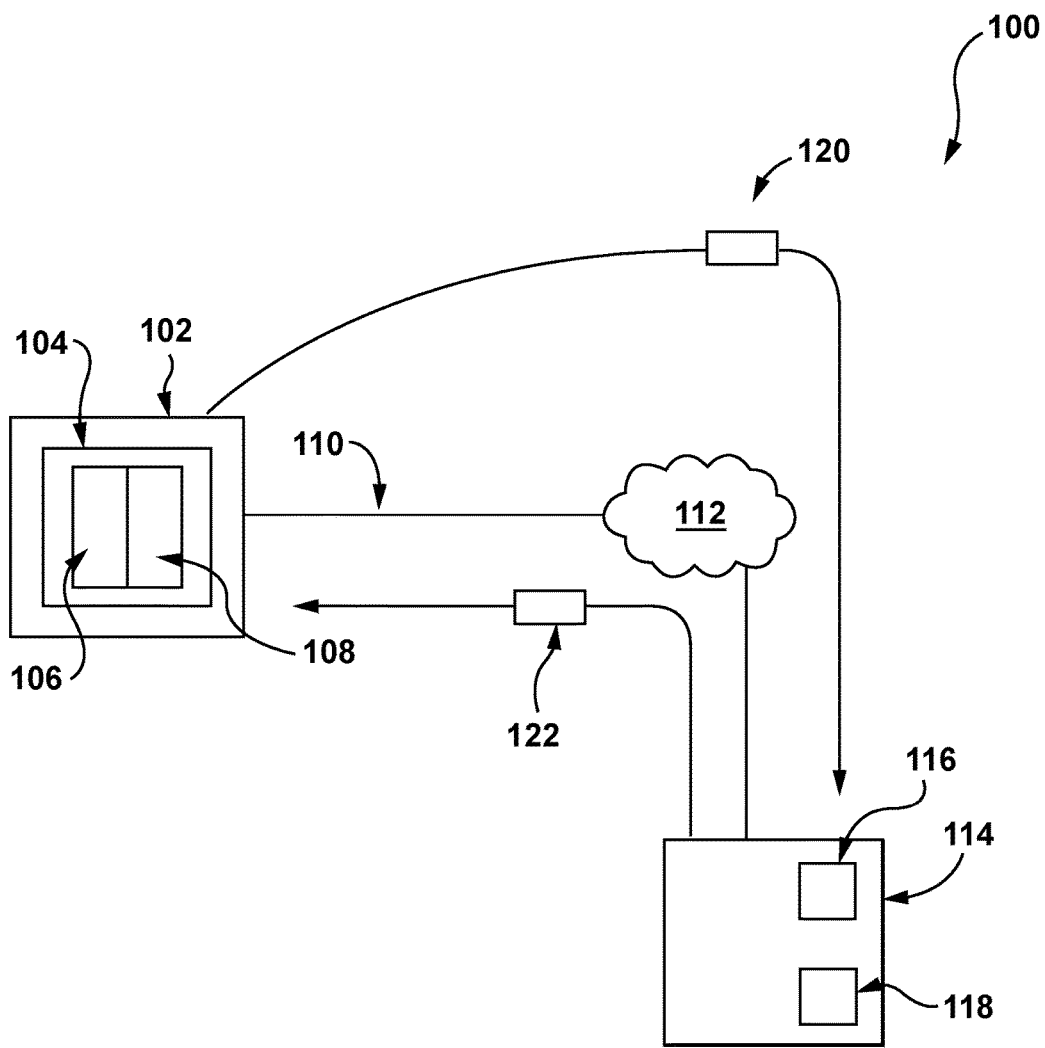
FIG. 1 depicts a system suitable for implementing embodiments of the present technology and/or being used in conjunction with implementations of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware, as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises hardware and/or software and/or firmware (or a combination thereof), as is known in the art to execute a translation application 104. Generally speaking, the purpose of the translation application 104 is to enable the user associated with the electronic device 102 to execute a translation of a source digital text 302 (depicted in FIG. 3) in a first language into a target digital text 318 (depicted in FIG. 3) in a second language. How the translation application 104 is implemented is not particularly limited. One example of the translation application 104 may be embodied in the user accessing a website associated with a translation service. For example, the translation application 104 can be accessed by typing in an URL associated with Yandex.Translate™ at translate.yandex.com. It should be expressly understood that the translation application 104 can be accessed using any other commercially available or proprietary translation services. Alternatively, the translation application 104 may be a locally stored and executed application.

Generally speaking, the translation application 104 comprises a text entry portion 106 configured to receive the source digital text 302 and a text output portion 108 configured to output the target digital text 318 that is a translation of the source digital text 302. How the target digital text 318 is outputted is described further below.

The electronic device 102 is coupled to a communication network 112 via a communication link 110. In some non-limiting embodiments of the present technology, the communication network 112 can be implemented as the Internet. In other embodiments of the present technology, the communication network 112 can be implemented differently, such as any wide-area communication network, local-area communications network, a private communications network and the like.

How the communication link 110 is implemented is not particularly limited and will depend on how the electronic device 102 is implemented. Merely as an example and not as a limitation, in those embodiments of the present technology where the electronic device 102 is implemented as a wireless communication device (such as a smart phone), the communication link 110 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 110 and the communication network 112 are provided for illustration purposes only. As such, those skilled in the art will easily appreciate other specific implementational details for the electronic device 102, the communication link 110, and the communication network 112. As such, by no means, examples provided hereinabove are meant to limit the scope of the present technology.

The system further includes a server 114 coupled to the communication network 112. The server 114 can be implemented as a conventional computer server. In an example of an embodiment of the present technology, the server 114 can be implemented as a Dell™ PowerEdge™ Server running the Microsoft™ Windows Server™ operating system. Needless to say, the server 114 can be implemented in any other suitable hardware and/or software and/or firmware or a combination thereof. In the depicted non-limiting embodiment of the present technology, the server 114 is a single server. In alternative non-limiting embodiments of the present technology, the functionality of the server 114 may be distributed and may be implemented via multiple servers.

The implementation of the server 114 is well known. However, briefly speaking, the server 114 comprises a communication interface (not depicted) structured and configured to communicate with various entities (such as the electronic device 102) via the communication network 112. The server 114 further comprises at least one computer processor (not depicted) operationally connected with the communication interface, structured and configured to perform a predefined set of computer executable operations in response to receiving a corresponding computer readable code selected from a predefined native instruction set of codes stored in a memory (not depicted) in order to execute various processes described herein. In some embodiments, the server 114 is under control and/or management of a translation service, such as that provided by Yandex.Translate™ of Yandex LLC of Lev Tolstoy Street, No. 16, Moscow, 119021, Russia.

Generally speaking, the server 114 is configured to receive a first data packet 120 from the translation application 104, the first data packet 120 comprising an indication of the source digital text 302 entered into the text entry portion 106. Upon acquiring the first data packet 120, a text processing application 116 of the server 114 is configured to generate the target digital text 318, which is a translation of the source digital text 302. Once the translation of the source digital text 302 (i.e. the target digital text 318) is generated, the server 114 is further configured to transmit a second data packet 122 to the translation application 104, the second data packet 122 comprising an indication of the target digital text 318 to be outputted in the text output portion 108 (and, optionally, an indication of the source digital text 302). The manner in which the translation application 104 generates the target digital text 318 is known in the art and will not be described herein.

Figure 3:
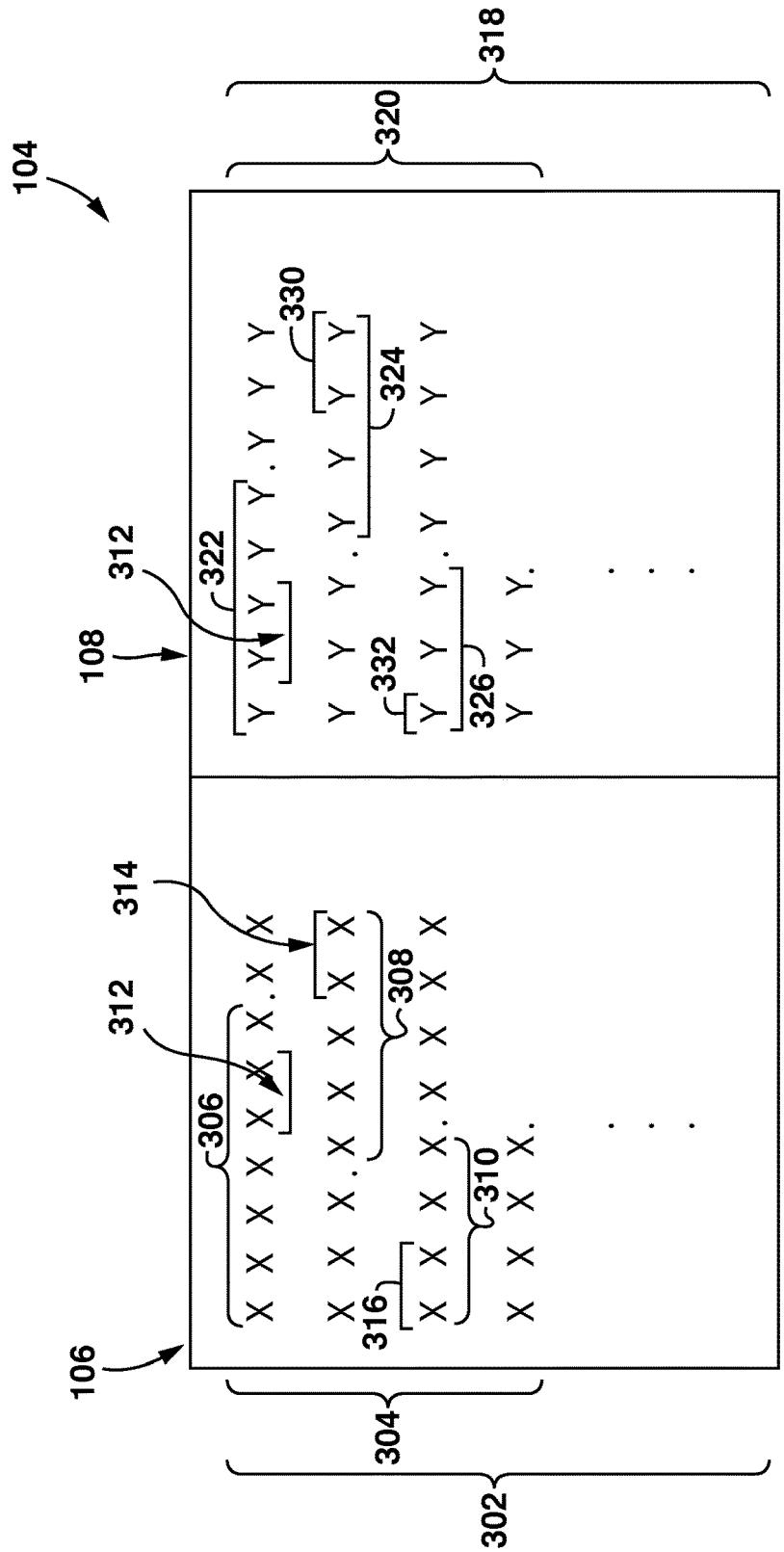
FIG. 3 depicts a screenshot showing two digital texts, namely a source digital text and a target digital text to be processed by the mapping application of FIG. 2.

FIG. 3 depicts a conventional screenshot of the translation application 104 following reception of the second data packet 122.

The text entry portion 106 comprises a source digital text 302. The source digital text 302 is made up of a plurality of source sentences 304, the plurality of source sentences 304 comprising a number of individual source sentences, such as a first source sentence 306, a second source sentence 308, and a third source sentence 310. Although in the depicted illustration, the plurality of source sentences 304 are separated by a full stop (i.e. a period), a person skilled in the art would understand that this is not always the case, and other punctuation marks, such as a question mark, an exclamation point may separate the plurality of source sentences 304. The first source sentence 306 comprises a first source lexical unit 312, the second source sentence 308 comprises a second source lexical unit 314, and the third source sentence 310 comprises a third source lexical unit 316. For the avoidance of doubt, it should be mentioned here that the source digital text 302 (and more specifically, each letter of the lexical units) is represented by an "X", however, in reality the individual lexical units are made of letters in the first language. For example, when the first language is English, the first source sentence 306 can be: "Although not an athlete, the lawyer was having a leg day, as he was running away from all the deadlines".

The text output portion 108 comprises a target digital text 318 that is generated by the text processing application 116. The target digital text 318 is made up of a plurality of target sentences 320, the plurality of target sentences 320 comprising a number of individual target sentences, such as a first target sentence 322, a second target sentence 324, and a third target sentence 326. Although in the depicted embodiment, the plurality of target sentences 320 are separated by a full stop (i.e. a period), a person skilled in the art would understand that this is not always the case, and other punctuation marks, such as a question mark, an exclamation point may separate the plurality of target sentences 320. The first target sentence 322 comprises a first target lexical unit 328, a second target lexical unit 330, and a third target lexical unit 332. For the avoidance of doubt, it should be mentioned here that the target digital text 318 (and more specifically, each letter of the lexical units) is represented by a "Y", however, in reality, the individual target lexical units are made of letters in the second language. For example, when the second language is French, the first target sentence 322 can be: "Sans être un athlète, l'avocat travaillait ses jambes, alors qu'il fuyait toutes les échéances".

In some embodiments, of the present technology, a given one of the lexical units (the first source lexical unit 312, the second source lexical unit 314, the third source lexical unit 316, the first target lexical unit 328, the second target lexical unit 330, the third target lexical unit 332) may be: (i) a word, the word being a smallest unit of speech that can stand by itself, or (ii) a phrase, the phrase being a meaningful entity comprising a group of two or more words (such as "modern computer systems", "information retrieval methods", "wooden chair", and the like), or a combination of both words and phrases.

Returning to FIG. 1, the server 114 further comprises a mapping application 118. As described below in more detail, the mapping application 118 comprises a set of computer-readable codes (as described above) executable by the processor (not depicted) of the server 114 to perform the various processes described below. Although the mapping application 118 is depicted as being separated from the text processing application 116, it is not limited as such, and the mapping application 118 may be part of the text processing application 116.

In some embodiments, the mapping application 118 is configured to acquire, before transmission of the second data packet 122 to the translation application 104, the source digital text 302 and the target digital text 318. The mapping application 118 is further configured to map each source lexical units (i.e. the first source lexical unit 312, the second source lexical unit 314, and the third source lexical unit 316) to its corresponding translation equivalent of the target lexical units (i.e. the first target lexical unit 328, the second target lexical unit 330, and the third target lexical unit 332). In yet another embodiment, the mapping application 118 is configured to align the plurality of source sentences 304 with the plurality of target sentences 320.

Mapping Application

Figure 2:
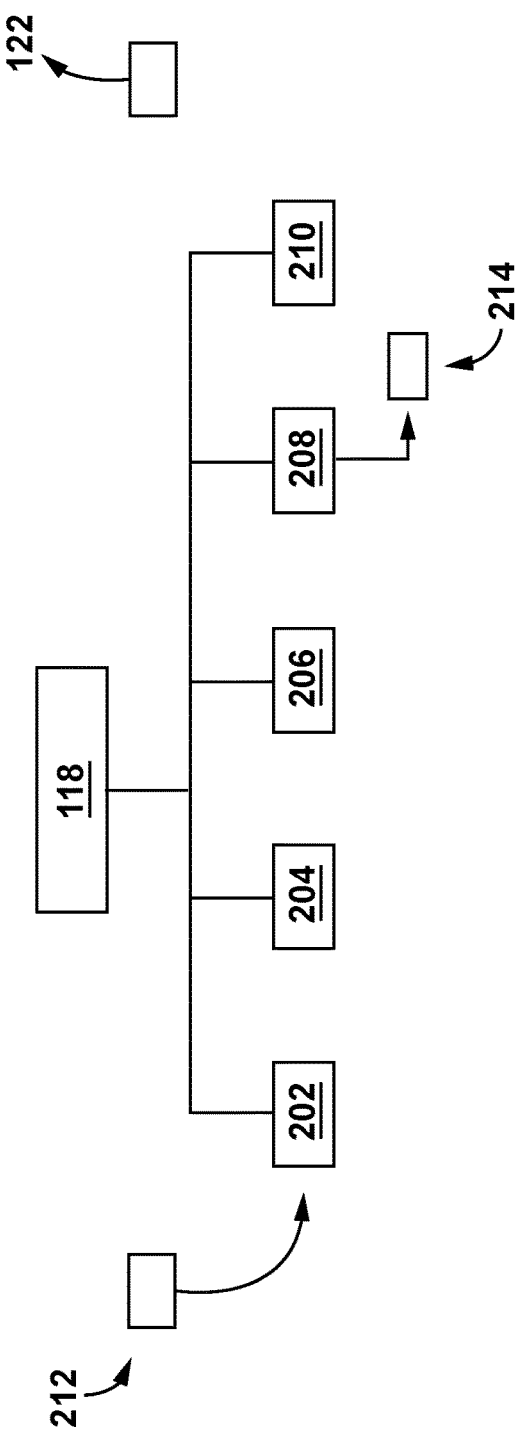
FIG. 2 depicts a schematic illustration of a mapping application of a server of the system of FIG. 1.

Functions and operations of the various components of the mapping application 118 are now described in greater details. With reference to FIG. 2, there is depicted a schematic illustration of the mapping application 118 for automatically mapping the source lexical units of the source digital text 302 to the target lexical units of the target digital text 318. The mapping application 118 executes (or otherwise has access to): a text acquiring routine 202, a parsing routine 204, a context parameter generating routine 206, a mapping routine 208, and a sentence aligning routine 210.

In the context of the present specification the term "routine" refers to a subset of the computer-readable codes of the mapping application 118 that is executable by the processor (not depicted) of the server 114 to perform the functions explained below. For the avoidance of doubt, it should be expressly understood that the text acquiring routine 202, the parsing routine 204, the context parameter generating routine 206, the mapping routine 208, and the sentence aligning routine 210 are depicted illustrated schematically herein in a separate and distributed manner for ease of explanation of the processes executed by the mapping application 118. It is contemplated that some or all of the text acquiring routine 202, the parsing routine 204, the context parameter generating routine 206, the mapping routine 208, and the sentence aligning routine 210 may be implemented as one or more combined routines.

Functionalities of each one of the text acquiring routine 202, the parsing routine 204, the context parameter generating routine 206, the mapping routine 208, and the sentence aligning routine 210, as well as data and/or information processed or stored therein is described below.

Text Acquiring Routine

In accordance with embodiments of the present technology, the text acquiring routine 202 is configured to acquire the data packet 212, which comprises an indication of the source digital text 302 and the target digital text 318.

How the text acquiring routine 202 acquires the data packet 212 is not limited, and it may acquire it directly from the text processing application 116, or from a digital memory device (not depicted) of the server 114 which stores indications of the source digital text 302 as well as the target digital text 318 generated by the text processing application 116.

Parsing Routine

Taking the source digital text 302 as an example, the parsing routine 204 is configured to parse the plurality of source sentences 304 into one or more individual source sentences, such as the first source sentence 306, the second source sentence 308 and the third source sentence 310. The manner in which the parsing is done is well known in the art and is not limited to any specific algorithm, and may be done by analyzing punctuation marks and/or applying grammatical rules.

In some embodiments of the present technology, the parsing routine 204 is further configured to tokenize each word of the source digital text 302 with an associated grammatical type (such as a noun, verb, etc.). The manner in which tokenization is done is well known in the art and is not limited to any specific algorithm, and may be done by analyzing the ending of surrounding words or the ending of the given word.

In some embodiments, the parsing routine 204 is further configured to select the first source lexical unit 312, the second source lexical unit 314, and the third source lexical unit 316.

As stated above, each source lexical unit may be a word, or a phrase. The manner of identifying a given phrase using two non-limiting manners is described below.

Figure 4:
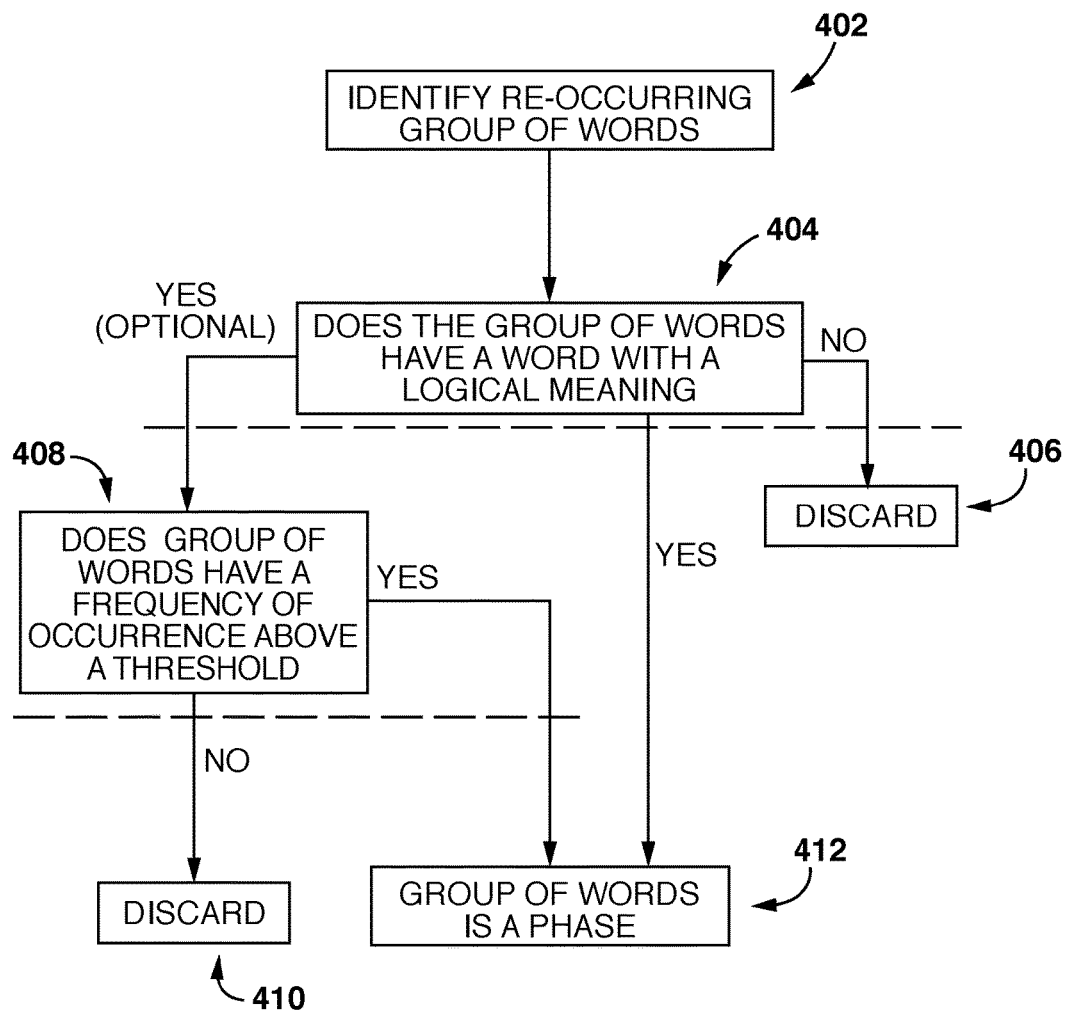
FIG. 4 depicts a first embodiment of a process for identifying a phrase within the two digital texts of FIG. 3.

FIG. 4 illustrates an embodiment of a first process for identifying a given phrase. At step 402, the parsing routine 204 is configured to analyze the plurality of source sentences 304 and identify at least one group of words, each group of words comprising at least two words, reoccurring together in the source digital text 302.

At step 404, for each identified group of words, the parsing routine 204 is configured to determine whether at least one word of the group of words has a logical meaning. In the context of the present technology, the terms "logical meaning" refer to the semantic conveyed by a lexical morpheme. In some embodiments of the present technology, the parsing routine 204 is configured to determine if a given word of the group of words has a logical meaning based on the grammatical type of the given word. For example, the parsing routine 204 is configured to identify lexical mor-phemes such as verbs, adjectives, and adverbs, as having a logical meaning. On the other hand, words that are grammatical morphemes (which specify a relation between other morphemes such as propositions, articles, conjunctions, and the like) are considered as not having a logical meaning by the parsing routine 204. In some embodiments, even if a given word of the group of words is determined to have a logical meaning, the parsing routine 204 is also configured to, based on an empirical analysis, consider the given word as not having a logical meaning if it is determined that the given word is meaningless, unimportant and/or noise-generating, such as commonly reoccurring verbs such as "to be", and "to have".

Following step 404, if there is at least one word having a logical meaning within the group of words, the method proceeds to step 412, where the parsing routine 204 is configured to identify the group of words as a phrase. On the other hand, if the identified group of words does not have at least one word with a logical meaning, the group of words is discarded at step 406.

Optionally, following step 404 and before proceeding directly to step 412, the parsing routine 204 may be configured to calculate the frequency of entry of the given group of words within the source digital text 302 at step 408. If the frequency is below a predetermined threshold (which may be empirically determined), the given group of words is discarded at step 410. If the given group of words has a frequency of entry above the predetermined threshold, the process proceeds to step 412 where the parsing routine 204 is configured to identify the group of words as a phrase.

Figure 5:
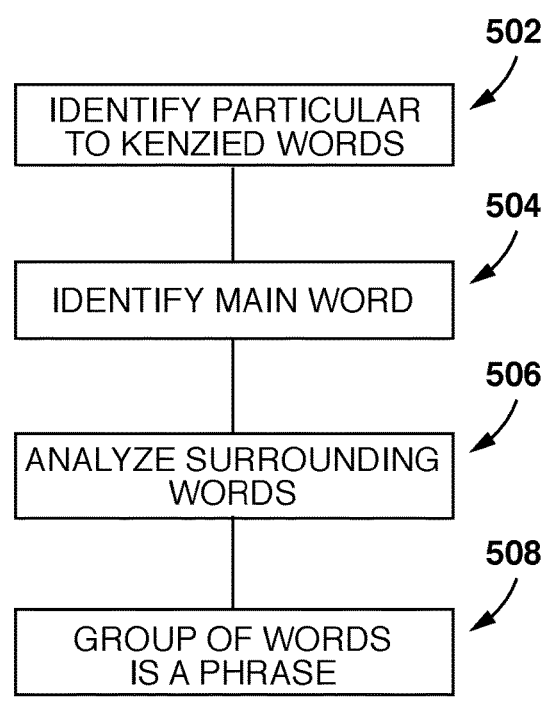
FIG. 5 depicts a second embodiment of a process for identifying a phrase within the two digital texts of FIG. 3.

FIG. 5 illustrates an embodiment of a second process of identifying a given phrase for the first source sentence 306, which may read as "He sat on the wooden chair of the captain". At step 502 the parsing routine 204 is configured to analyze the sentence and identify the words previously tokenized as a particular grammatical type, such as nouns (thus "chair" and "captain"). At step 504, the parsing routine 204 is configured to analyze the words identified as nouns and determine whether a given word identified as a noun is a "trigger word", which is the main word of the phrase.

Specific heuristic rules for identifying the trigger word vary (i.e. specific rules can be language-specific). In Russian language, the main word is typically the leftmost noun within the phrase. In English language, it may be the rightmost noun if there is no preposition such as "of", otherwise the leftmost noun before the preposition. Thus in the example provided, the word "chair" is considered by the parsing routine 204 to be the trigger word. At step 506, the parsing routine 204 is further configured to analyze the surrounding words of the trigger word and determine whether one or more surrounding words form a logical entity with the trigger word. For example, the parsing routine 204 may be configured to consider words of certain type, such as adjectives, nouns, and the like, placed next to the trigger word as forming a logical entity with the trigger word (ex. "wooden chair").

In some embodiments of the present technology, as part of identifying phrases as lexical units, the parsing routine 204 is configured to lemmatize each word of each identified phrase.

The manner in which a given word is lemmatized is known in the art, but suffice it to say that the lemmatization may be done by stemming and analyzing the given word to generate a lemma of said given word, as is known in the art. Needless to say, lemmatization may additionally or optionally use a dictionary to improve the quality of the lemmatization.

In some embodiments, the parsing routine 204 is further configured to rearrange the words of the identified phrase, such that a rearranged version of the phrase is made up of the words in an alphabetical order. Naturally, the parsing routine 204 can rearrange the words using a different approach (such as the first word being a word having a logical meaning, followed by a remainder of lemmatized words ranked in alphabetical order).

Just as an example, a first identified phrase can be "information search systems" and a second identified phrase can be "system for information searching". Using the various techniques described above, the parsing routine 204 lemmatizes the first identified phrase to "system information search" and the second identified phrase to "system information search". A specific technical effect of the parsing routine 204 lemmatizing and/or re-arranging the one or more identified phrases is the ability to more efficiently determine similarity between different ones of the one or more identified phrases (the process described below).

Needless to say, other means of identifying a phrase in the source digital text 302 are known in the art and the processes and examples provided above are not meant to be limitative.

Once the one or more phrases are identified in the source digital text 302, the parsing routine 204 is configured to select the one or more identified phrases as source lexical units. For example, if the parsing routine 204 has identified, within the source digital text 302, two phrases, the parsing routine 204 will select the two phrases as the first source lexical unit 312 and the second source lexical unit 314.

Once the parsing routine 204 has selected one or more phrases as source lexical units, it will select one or more words as source lexical units. The manner of selecting a given word as the given source lexical unit is described below.

In some embodiments, the parsing routine 204 is configured to exclude the previously identified phrases from the source digital text 302 and identify the token of the remaining words comprising the source digital text 302 and select a word that is one of a particular given grammatical type. In some embodiments, the parsing routine 204 is configured to select words having a logical meaning, as described above.

Although the functions of the parsing routine 204 have been explained with regards to the source digital text 302 and with no reference to the target digital text 318, this is merely done so to avoid redundancy. Needless to say, the parsing routine 204 is also configured to execute the various functions provided hereinabove to the target digital text 318 to identify and select the target lexical units (the first target lexical unit 328, the second target lexical unit 330, and the third target lexical unit 332).

Context Parameter Generating Routine

Once the parsing routine 204 has selected the source lexical units, the context parameter generating routine 206 is configured to analyze a first relationship for each source lexical units in relation to each remaining lexical units.

Figure 6:
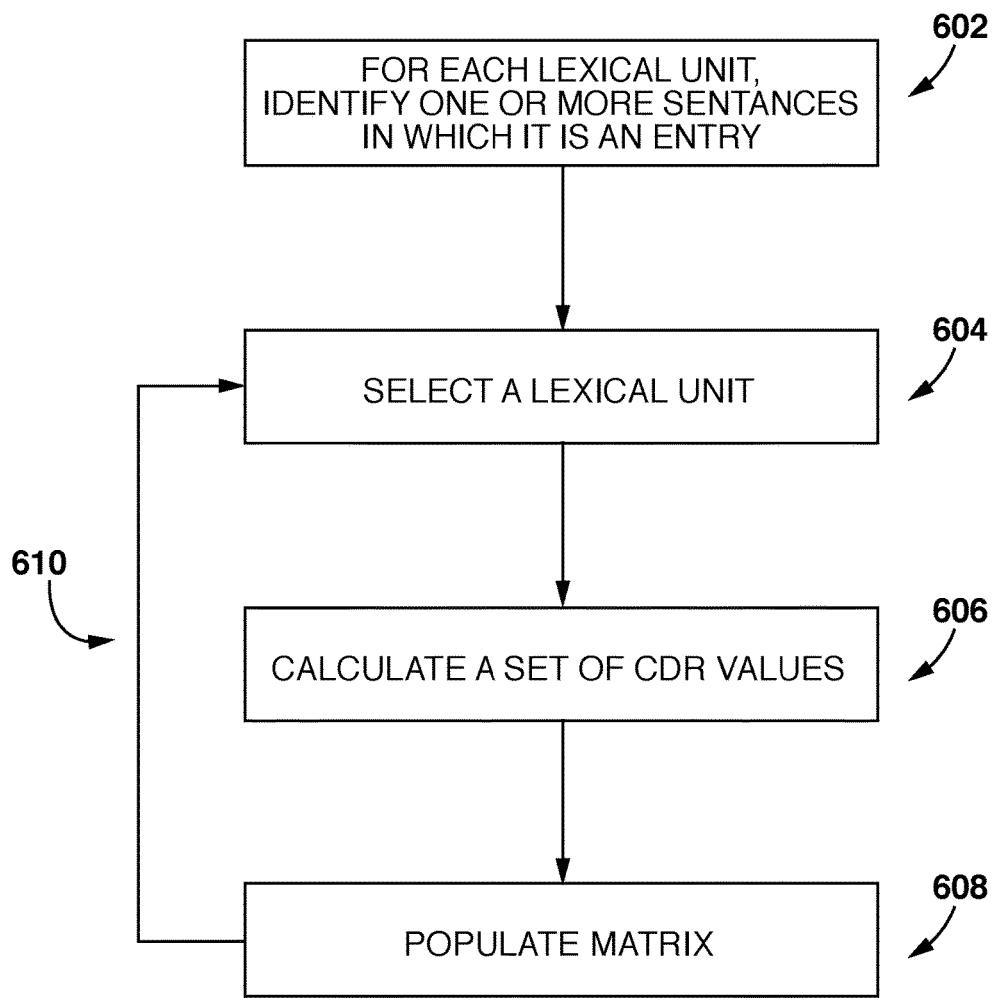
FIG. 6 depicts a flowchart of a process for populating a context dependent relation (CDR) matrix.

FIG. 6 illustrates a flowchart of analyzing the first relationship between each source lexical units according to some embodiments of the present technology by the context parameter generating routine 206. For the avoidance of redundancy, the explanation of the process is done using the source digital text 302 but the below described process also applies to the target digital text 318.

At step 602, the context parameter generating routine 206 is configured to identify, for each source lexical units (i.e. the first source lexical unit 312, the second source lexical unit 314 and the third source lexical unit 316), one or more source sentences in which they occur. For example, the context parameter generating routine 206 may determine that the first source lexical unit 312 is an entry within the source sentences #1, #4, #5 and #7 of the source digital text 302, the second source lexical unit 314 is an entry within the source sentences #1, #4, #7 and #8 of the source digital text 302, and the third source lexical unit 316 is an entry within the source sentences #2, #3, #8 and #9 of the source digital text 302.

At step 604, the context parameter generating routine 206 is configured to select a given source lexical unit, such as the first source lexical unit 312.

At step 606, the context parameter generating routine 206 executes a first analysis to generate a source context-dependent relation (CDR) value for the first source lexical unit 312 in relation to each remaining source lexical units (i.e. the second source lexical unit 314, the third source lexical unit 316). Generally speaking, a source CDR value represents a first ratio of: (i) a number of source sentences where the first source lexical unit 312 co-occurs with another source lexical unit (i.e. the second source lexical unit 314, and the third source lexical unit 316) and (ii) a total number of source sentences which has the first source lexical unit 312 as an entry, within the source digital text 302.

At step 608, the context parameter generating routine 206 populates the obtained values in a first source matrix 700 (depicted in FIG. 7 and explained below).

At step 610, the context parameter generating routine 206 iteratively performs the same process with regards to the remaining source lexical units (i.e. the second source lexical unit 314 and the third source lexical unit 316).

Figure 7:
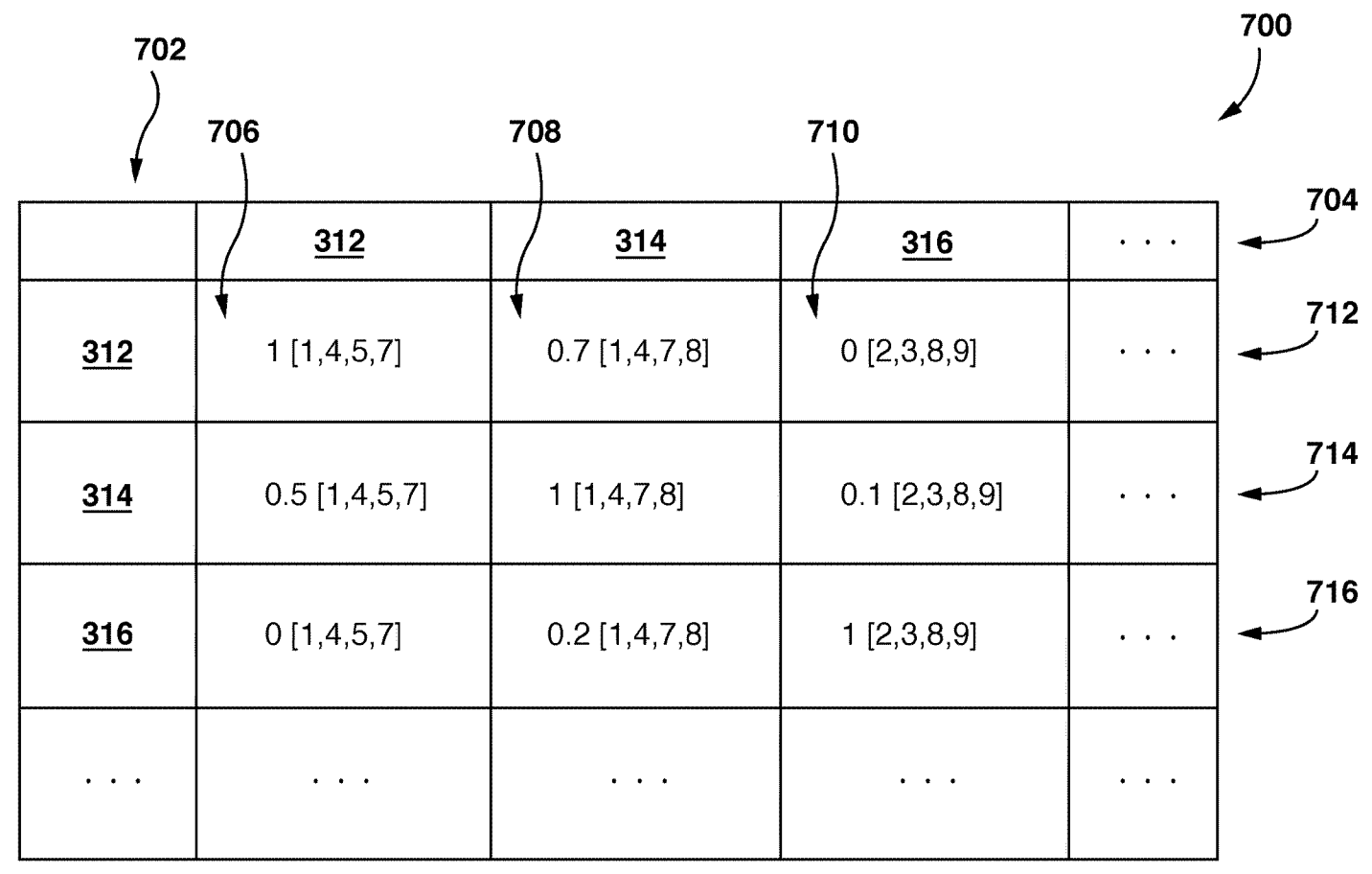

FIG. 7 illustrates an example of the first source matrix 700. As illustrated in the first source matrix 700, each entry of a first column 702 and a first row 704 comprises an indication of a given source lexical unit (e.g. the first source lexical unit 312, the second source lexical unit 314 and the third source lexical unit 316). The first source matrix 700 comprises a plurality of cells (such as a first cell 706, a second cell 708, and a third cell 710).

In some embodiments of the present technology, each cell comprises an indication of one or more source sentences in which each of the source lexical unit occurs within the source digital text 302, as determined during step 602.

In addition to the indication of the one or more source sentences, each cell further comprises an indication of the source CDR value amongst each of the source lexical units as determined at step 606. Taking the first source lexical unit 312 as an example, the source CDR value of the first source lexical unit 312 in relation to the first source lexical unit 312 is 1 (as shown in the first cell 706); the source CDR value of the first source lexical unit 312 in relation to the second source lexical unit 314 is 0.7 (as shown in the second cell 708); and the source CDR value of the first source lexical unit 312 in relation to the third source lexical unit 316 is 0 (as shown in the third cell 710).

Once the first source matrix 700 is populated, the context parameter generating routine 206 is configured to extract a first source context parameter 712 for the first source lexical unit 312, a second source context parameter 714 for the second source lexical unit 314, and a third source context parameter 716 for the third source lexical unit 316.

In the context of the present technology, the term "context parameter" refers to an indication of set of source CDR values associated with a given lexical unit, as well as an indication of the sentences in which each lexical unit occur.

For example, the first source context parameter 712 corresponds to the row associated with the first source lexical unit 312 in the first source matrix 700 and comprises of the set of source CDR values associated with the first source lexical unit 312 (i.e. the source CDR values stored in the first cell 706, the second cell 708 and the third cell 710), and of the indications of the sentences in which each lexical unit occurs (i.e. indications of sentences stored in the first cell 706, the second cell 708 and the third cell 710).

In some embodiments of the present technology, the context parameter generating routine 206 is further configured to analyze a second relationship for each source lexical units in relation to each remaining lexical units.

Figure 8:
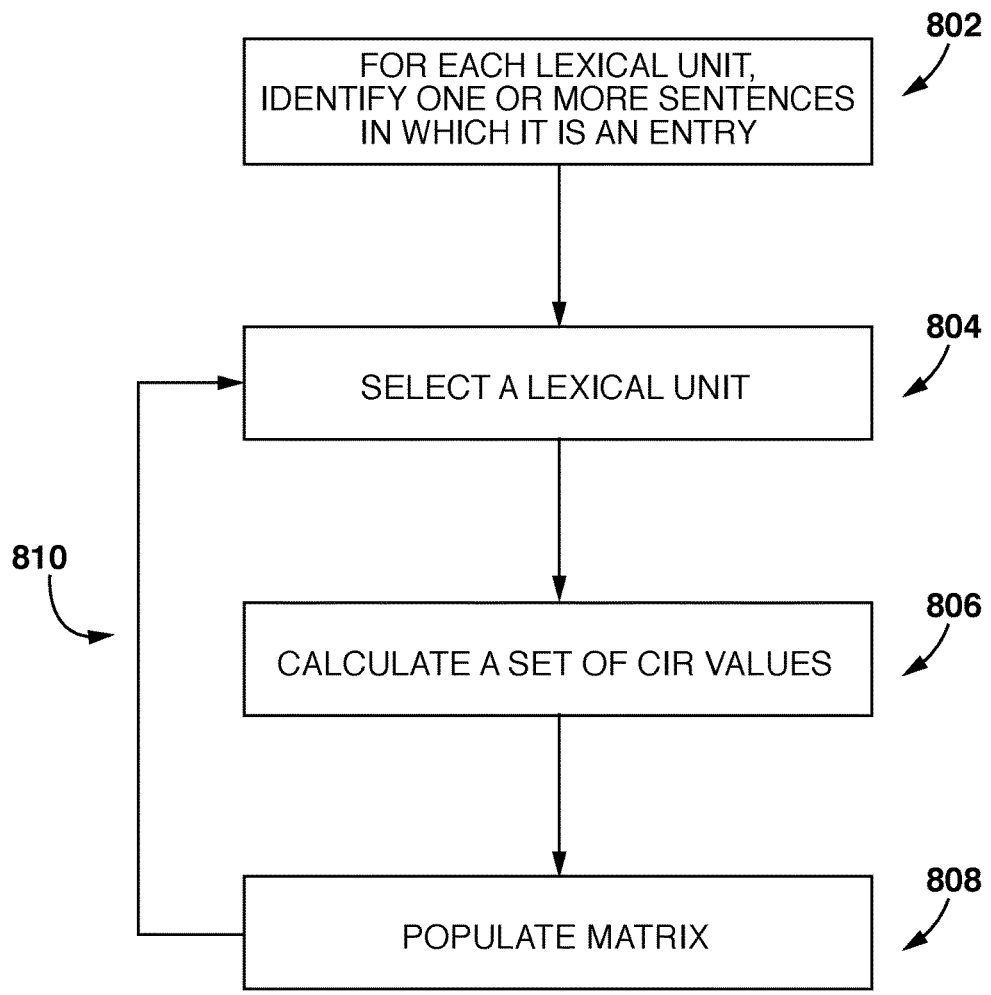
FIG. 8 depicts a flowchart of a process for populating a context independent relation (CIR) matrix.

FIG. 8 illustrates a flowchart of analyzing the second relationship between each lexical unit according to some embodiments of the present technology by the context parameter generating routine 206. For the avoidance of redundancy, the explanation of the process is done using the source digital text 302.

At step 802, the context parameter generating routine 206 is configured to identify, for each source lexical units (i.e. the first source lexical unit 312, the second source lexical unit 314 and the third source lexical unit 316), one or more source sentences in which they occur. For example, the context parameter generating routine 206 may determine that the first source lexical unit 312 is an entry within the source sentences #1, #4, #5 and #7 of the source digital text 302, the second source lexical unit 314 is an entry within the source sentences #1, #4, #7 and #8 of the source digital text 302, and the third source lexical unit 316 is an entry within the source sentences #2, #3, #8 and #9 of the source digital text 302.

At step 804, the context parameter generating routine 206 selects a given source lexical unit, such as the first source lexical unit 312.

At step 806, the context parameter generating routine 206 is configured to execute a second analysis to generate a source context-independent relation (CIR) value for the first source lexical unit 312 in relation to each remaining source lexical units (i.e. the second source lexical unit 314, the third source lexical unit 316). Generally speaking, the source CIR value of the first source lexical unit 312 in relation to a given other source lexical unit represents a second ratio of: (i) a number of words of the first source lexical unit 312 occurring in the given other source lexical unit and (ii) the total number of words of the first source lexical unit 312.

Figure 9:
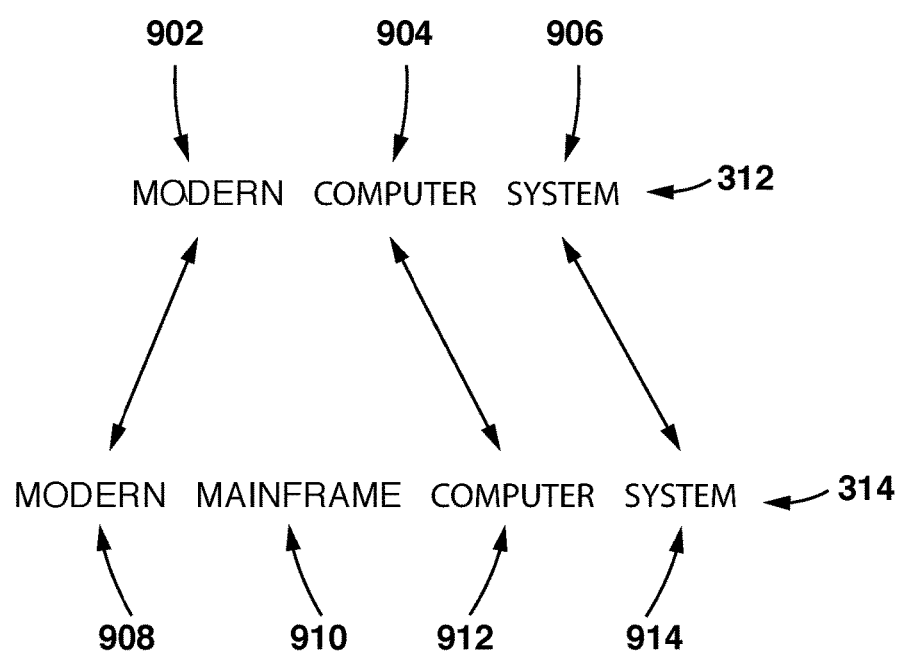
FIG. 9 depicts an example of determining a CIR value according to the process of FIG. 8.

FIG. 9 illustrates an example of determining the source CIR value between the first source lexical unit 312 and the second source lexical unit 314. In the provided example, the first source lexical unit 312 is the phrase "modern computer system", which comprises a first word 902 ("modern"), a second word 904 ("computer") and a third word 906 ("system"). The second source lexical unit 314 is the phrase "modern mainframe computer system", which comprises a fourth word 908 ("modern"), a fifth word 910 ("mainframe"), a sixth word 912 ("computer"), and a seventh word 914 ("system").

The context parameter generating routine 206 calculates the source CIR value of the first source lexical unit 312 in relation to the second source lexical unit 314 to be 1, since all the words of the first source lexical unit 312 (i.e. the first word 902, the second word 904 and the third word 906) are contained within the second source lexical unit 314. By the same token, the source CIR value of the second source lexical unit 314 in relation to the first source lexical unit 312 would be 0.75, since only the 3 words (i.e. the fourth word 908, sixth word 912 and seventh word 914) out of the 4 words making up the second source lexical unit 314 are contained within the first source lexical unit 312.

Returning to FIG. 8, once the source CIR values of the first source lexical unit 312 in relation to each of the remaining source lexical units have been calculated, the context parameter generating routine 206 populates the obtained values in a second source matrix 1000 (discussed below) at step 808.

At step 810, the context parameter generating routine 206 iteratively performs the same process with regards to the remaining source lexical units (i.e. the second source lexical unit 314 and the third source lexical unit 316).

Figure 10:
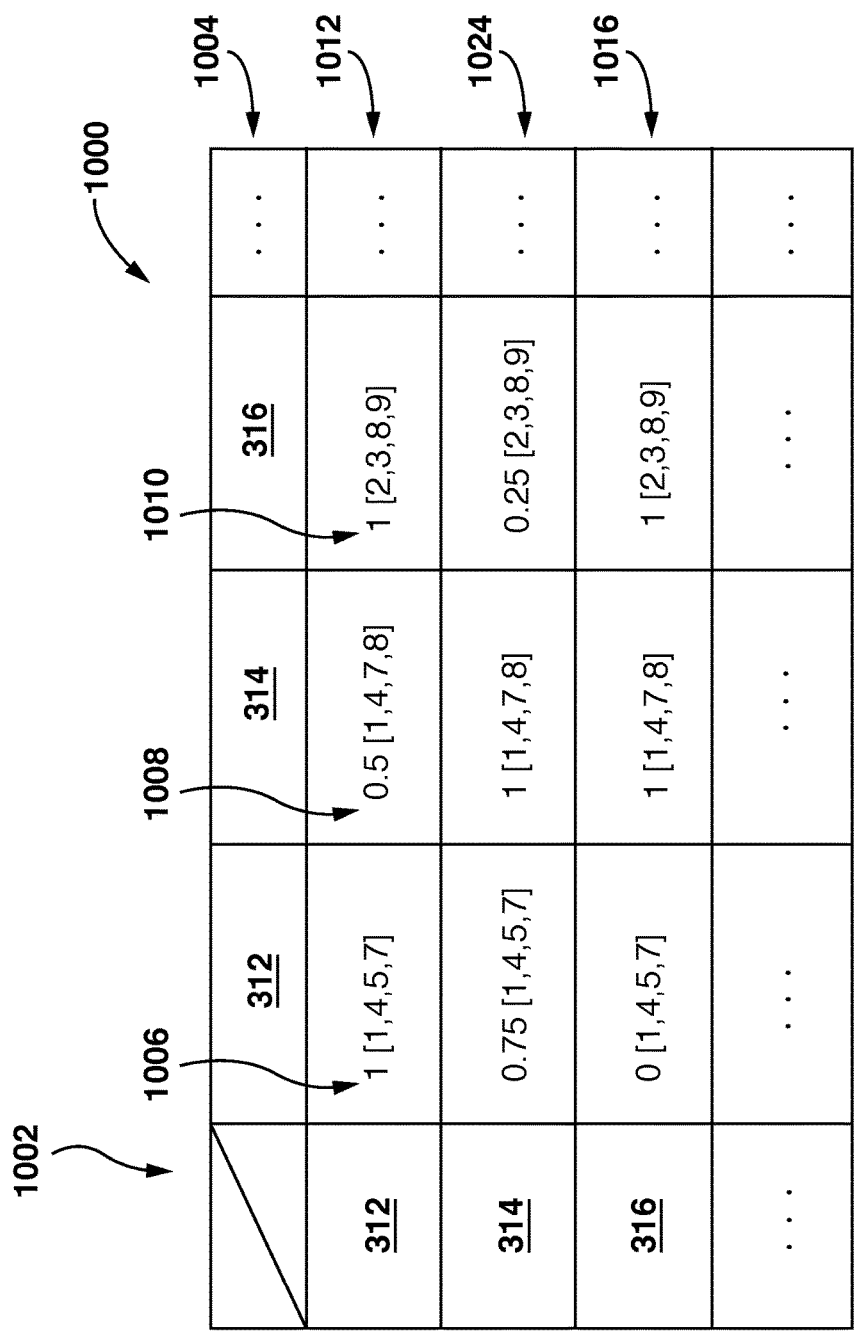
FIG. 10 depicts a schematic illustration of the CDR matrix of populated by the process of FIG. 8.

FIG. 10 illustrates an example of the second source matrix 1000. As illustrated in the second source matrix 1000, each entry of a first column 1002 and a first row 1004 comprises an indication of a given source lexical unit (such as a first cell 706, a second cell 708, and a third cell 710). The second source matrix 1000 further comprises a plurality of cells (for example, a first cell 1006, a second cell 1008, and a third cell 1010).

In some embodiments of the present technology, each cell comprises an indication of the one or more source sentences in which each of the source lexical unit occurs within the source digital text 302, as determined at step 802. For example, the first cell 1006 indicates that the first source lexical unit 312 occurs in the source sentences identified as #1, #4, #5 and #7.

In addition to the indication of the one or more source sentences, each cell further comprises an indication of the source CIR value amongst each of the source lexical units as determined at step 806. Taking the first source lexical unit 312 as an example, the source CIR value of the first source lexical unit 312 in relation to the first source lexical unit 312 is 1 (as shown in the first cell 1006); the source CIR value of the first source lexical unit 312 in relation to the second source lexical unit 314 is 0.5 (as shown in the second cell 1008); and the CIR value of the first source lexical unit 312 in relation to the third source lexical unit 316 is 1 (as shown in the third cell 1010).

Once the second source matrix 1000 is populated, the context parameter generating routine 206 is configured to extract a first source alternate context parameter 1012 for the first source lexical unit 312, a second source alternate context parameter 1014 for the second source lexical unit 314, and a third source alternate context parameter 1016 for the third source lexical unit 316.

In the context of the present technology, the term "alternate context parameter" refers to an indication of a set of CDR values associated with a given lexical unit, as well as an indication of the sentences in which each lexical unit occur.

For example, the first source alternate context parameter 1012 corresponds to the row associated with the first source lexical unit 312 in the second source matrix 1000 and comprises of the set of source CIR values associated with the first source lexical unit 312 (i.e. the source CIR values comprising the first cell 1006, the second cell 1008 and the third cell 1010), and of the indications of the sentences in which each lexical unit occur as indicated within the first cell 1006, the second cell 1008 and the third cell 1010.

Although the functions of the context parameter generating routine 206 have been explained with regards to the source digital text 302 and with no reference to the target digital text 318, this is merely done so to avoid redundancy. Needless to say, the context parameter generating routine 206 is further configured to execute the various functions described hereinabove in relation to the target digital text 318 to generate a first target matrix, a second target matrix, a target context parameter and a target alternate context parameter for each target lexical units (the first target lexical unit 328, the second target lexical unit 330, and the third target lexical unit 332).

Mapping Routine

Embodiments of the present technology are based on developers' appreciation that a given source context parameter relates to a given target context parameter the same way as a given source lexical unit relates to a given target lexical unit, and thus mapping the given source lexical unit to the given target lexical unit can be done by determining the similarity between the given source context parameter and the given target context parameter.

The mapping of a given source lexical unit with a given target lexical unit using two non-limiting processes is described below.

Figure 11:
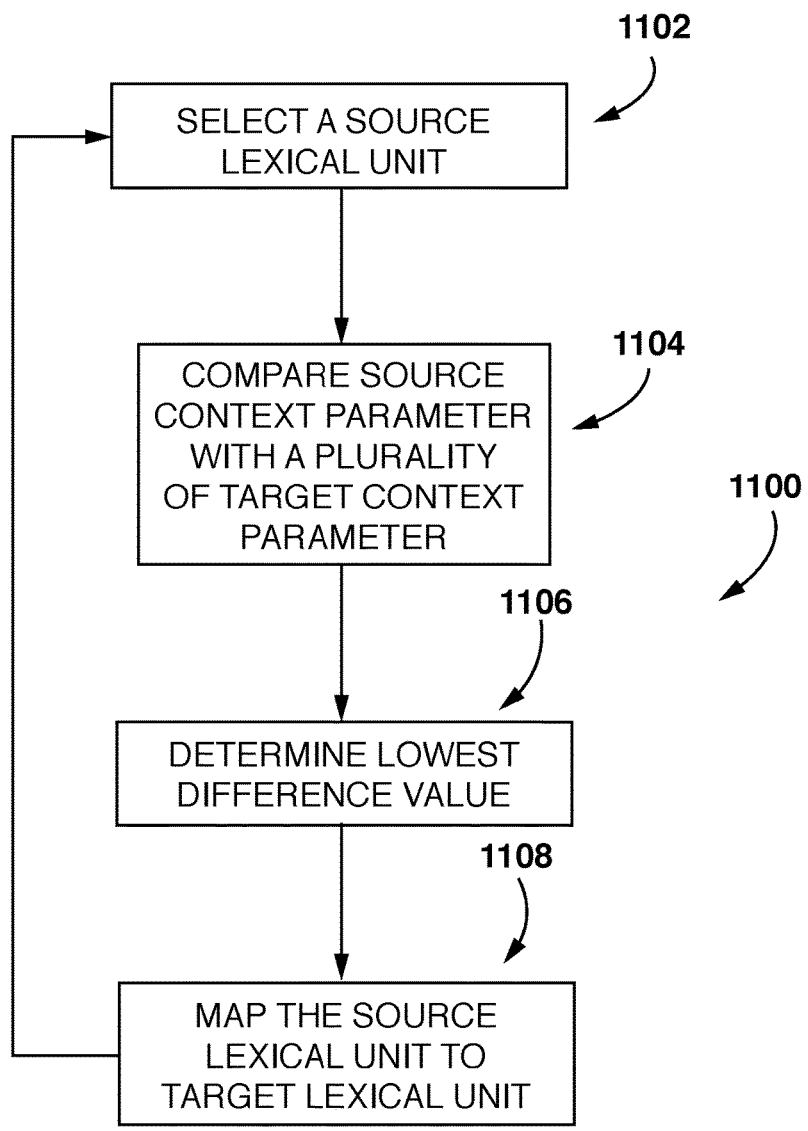
FIG. 11 depicts a first embodiment for mapping a source lexical unit to a target lexical unit by the mapping application of FIG. 2.

FIG. 11 illustrates a non-limiting embodiment of a first process 1100 of mapping a given source lexical unit with a given target lexical unit.

At step 1102, the mapping routine 208 is configured to select one source lexical unit, such as the first source lexical unit 312.

At step 1104, the mapping routine 208 is configured to compare the first source context parameter 712 (which is associated with the first source lexical unit 312) with a set of target context parameters.

Figure 12:
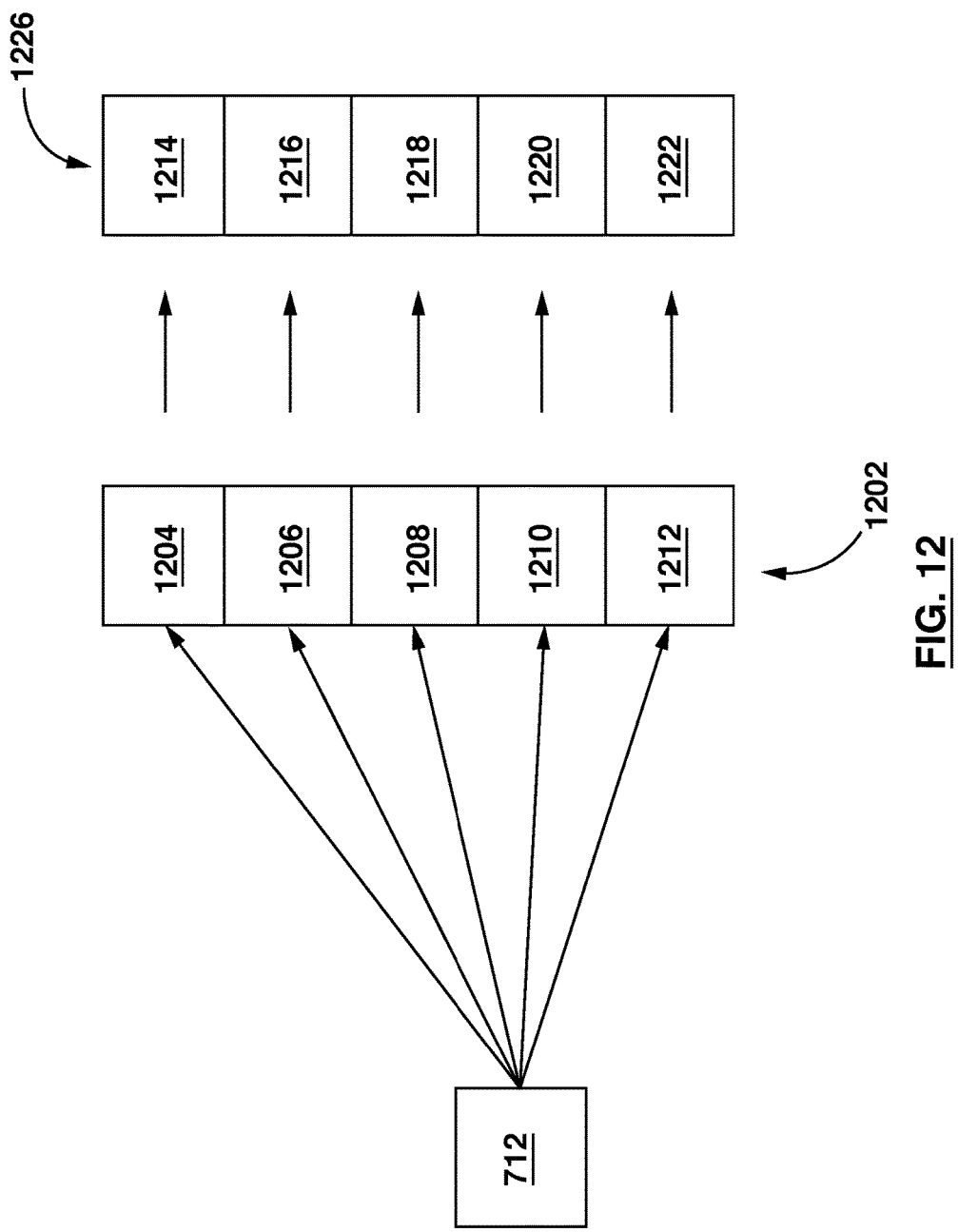
FIG. 12 depicts a schematic illustration of the process of FIG. 11.

FIG. 12 illustrates a non-limiting example of comparing the first source context parameter 712 with a set of target context parameters in accordance with step 1104.

In the provided example, the first source context parameter 712 is compared to each target context parameters from a plurality of target context parameters 1202. The plurality of target context parameters 1202 comprises five target context parameters, namely a first target context parameter 1204 (which may be associated with the first target lexical unit 328), a second target context parameter 1206 (which may be associated with the second target lexical unit 330), a third target context parameter 1208 (which may be associated with the third target lexical unit 332), a fourth target context parameter 1210 and a fifth target context parameter 1212 (which may be respectively associated with a fourth and fifth target lexical unit (not depicted) potentially present in the target digital text 318).

In some embodiments of the present technology, for the first source context parameter 712, the mapping routine 208 is configured to calculate a set of similarity parameters 1226, which comprises a first similarity parameter 1214, a second similarity parameter 1216, a third similarity parameter 1218, a fourth similarity parameter 1220, and a fifth similarity parameter 1222.

In the context of the present specification, the term "similarity parameter" refers to a score (such as a percentage) having a difference value representing a degree of dissimilarity between a given source context parameter and a target context parameter (or conversely, the lower the score the higher the degree of similarity between the given source context parameter and the target context parameter is). For example, the first similarity parameter 1214 represents the similarity between the first source context parameter 712 and the first target context parameter 1204. The manner of determining the first similarity parameter 1214, the second similarity parameter 1216, the third similarity parameter 1218, the fourth similarity parameter 1220, and the fifth similarity parameter 1222 is described further below with reference to FIG. 13.

Returning to FIG. 11, once the set of similarity parameters 1226 has been calculated, the process proceeds to step 1106. At step 1106, the mapping routine 208 is configured to analyze the set of similarity parameters 1226 and identify the similarity parameter which represents a score of a lowest difference value (i.e. indicative of the highest similarity between the first source context parameter 712 and a given target context parameter from the plurality of target context parameters 1202).

For example, it may be determined that within the set of similarity parameters 1226, the second similarity parameter 1216 is indicative that the first source context parameter 712 and the second target context parameter 1206 have the lowest difference amongst them.

Once the lowest difference value has been identified, the mapping routine 208 proceeds to step 1106 where it is configured to identify the target lexical unit that is associated with the similarity parameter having the lowest difference value (in the example above, it would be the second target lexical unit 330), and map the first source lexical unit 312 to the identified target lexical unit to form a mapped pair.

In some embodiments, the mapping routine 208 is configured to iteratively map the remaining source lexical units (such as the second source lexical unit 314 and the third source lexical unit 316) to form a plurality of mapped pairs. In other words, once the step 1108 is done for the first source lexical unit 312, the mapping routine 208 is configured to return to step 1102 to identify a given target lexical unit to be mapped with the remaining source lexical units.

Figure 14:
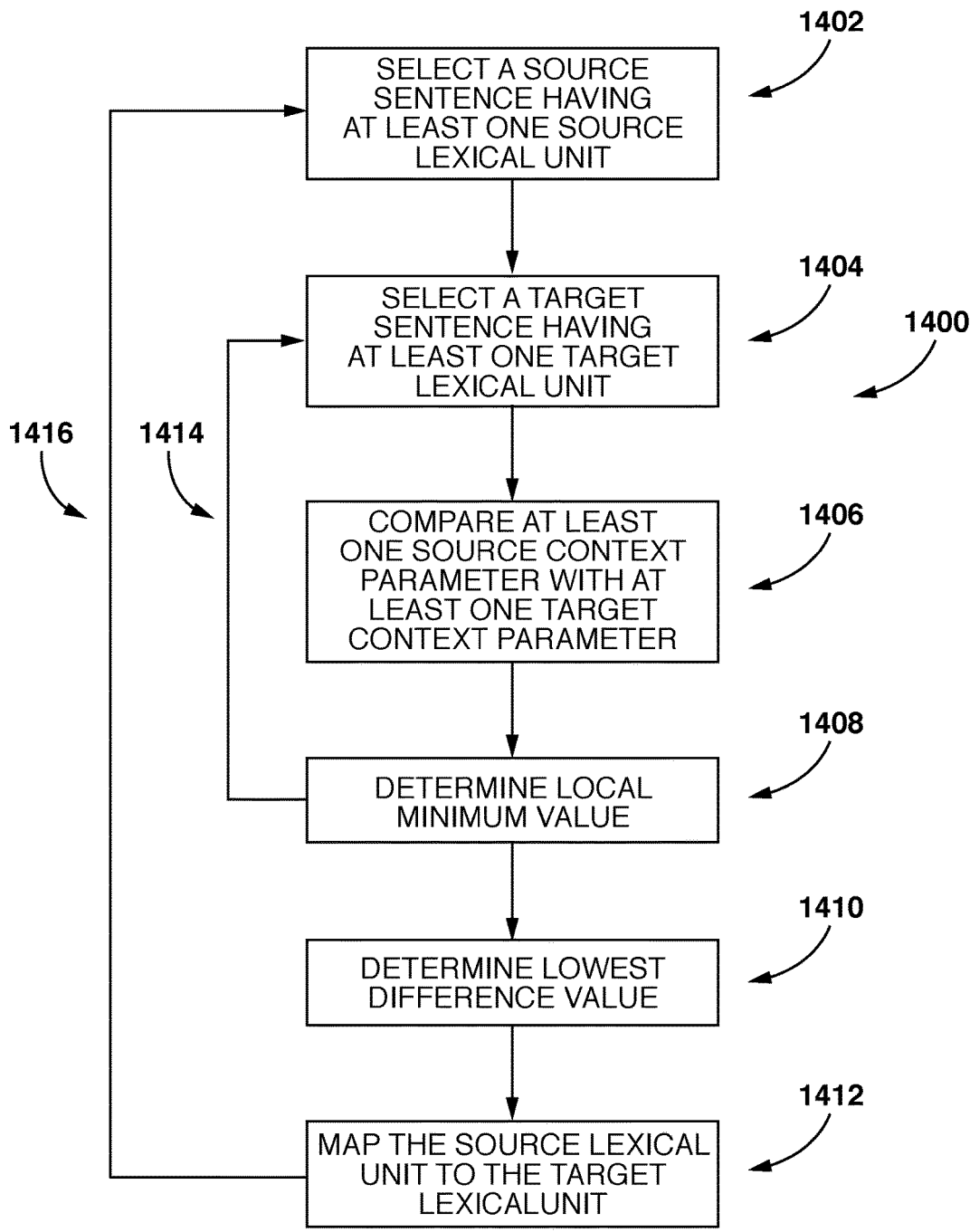
FIG. 14 depicts a second embodiment of a process for mapping a source lexical unit to a target lexical unit by the mapping application of FIG. 2.

FIG. 14 illustrates another non-limiting embodiment of a second process 1400 of mapping a given target lexical unit to a given target lexical unit.

At step 1402, the mapping routine 208 selects a source sentence (such as the first source sentence 306, the second source sentence 308, or the third source sentence 310) which comprises the first source lexical unit 312.

At step 1404, the mapping routine 208 selects a target sentence (such as the first target sentence 322, the second target sentence 324, and the third target sentence 326) which comprises at least one target lexical unit (such as the first target lexical unit 328, the second target lexical unit 330 and the third target lexical unit 332).

At step 1406, the mapping routine 208 is configured to compare the first source context parameter 712 with each of the target context parameters associated with the selected target sentence (described further below).

Figure 15:
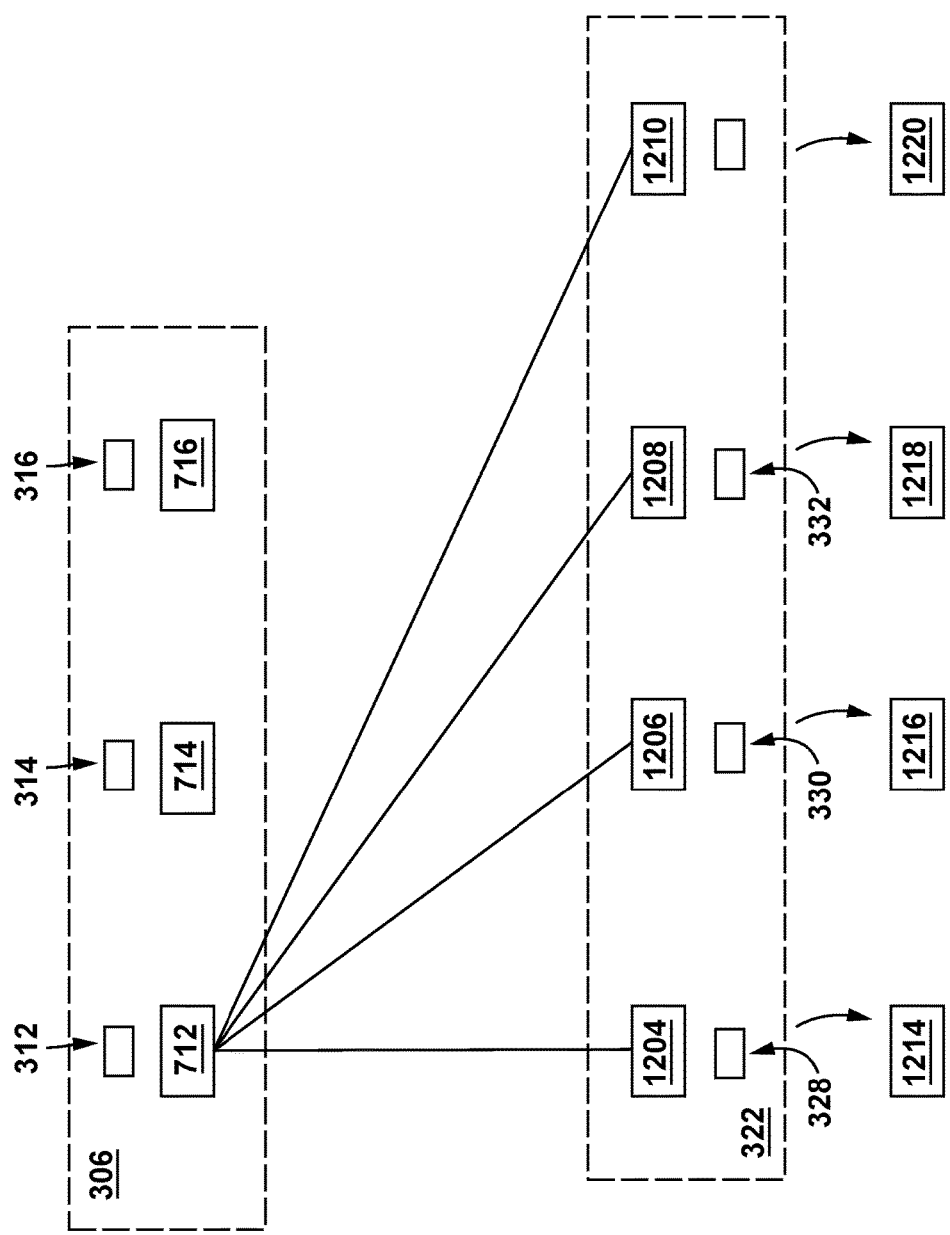
FIG. 15 depicts a schematic illustration of the process of FIG. 14.

The step 1406 is explained using FIG. 15, which is a non-limiting example thereof. As illustrated in FIG. 15, there is provided the first source sentence 306, which comprises the first source lexical unit 312, the second source lexical unit 314 and the third source lexical unit 316. The first target sentence 322 comprises the first target lexical unit 328, the second target lexical unit 330, the third target lexical unit 332, and a fourth target lexical unit (not numbered).

In some embodiments of the present technology, the mapping routine 208 is configured to compare (described further below) the first source context parameter 712 with each target context parameters associated with the target lexical units comprising the first target sentence 322 (i.e. the first target context parameter 1204, the second target context parameter 1206, the third target context parameter 1208 and the fourth target context parameter 1210), in order to generate the first similarity parameter 1214, the second similarity parameter 1216, the third similarity parameter 1218 and the fourth similarity parameter 1220.

Once the comparing of the first source context parameter 712 with each target context parameters is completed, the process proceeds to step 1408, where the mapping routine 208 identifies the similarity parameter representing a score having a local minimum value within the given target sentence (i.e. indicative of the highest similarity between the first source context parameter 712 and a given target context parameter within the given target sentence).

For example, it may be determined that within the first target sentence 322, the first similarity parameter 1214 is indicative that the first source context parameter 712 and the first target context parameter 1204 have the lowest difference amongst them.

Returning to FIG. 14, at step 1414, the mapping routine 208 iteratively performs the same process with regards to the remaining target sentences to calculate a plurality of local minimum values.

FIG. 16 provides an example of a table list 1600 comprising a set of local minimum values 1602 identified during step 1408 for the first source context parameter 712. For example, it may be determined that the local minimum value within the first target sentence 322 is the first similarity parameter 1214 (which is associated with the first target lexical unit 328), the third similarity parameter 1218 (which is associated with the third target lexical unit 332) for the second target sentence 324, and the fourth similarity parameter 1220 (which is associated with the fourth target lexical unit (not depicted)) for the third target sentence 326.

Returning to FIG. 14, once the table list 1600 has been populated with at least a subset of the set of local minimum values 1602, the mapping routine 208 is configured to identify at step 1410, the similarity parameter which represents the score of the lowest difference value (i.e. indicative of the highest similarity between the first source context parameter 712 and a given target context parameter, selected from the entire set of local minimum values 1602). For example, it may be determined that within the set of local minimum values 1602, the first similarity parameter 1214 has the lowest difference value.

Once the lowest difference value has been identified, the mapping routine 208 is configured, at step 1412, to map the first source lexical unit 312 to the target lexical unit that is associated with the lowest difference value, namely, the first target lexical unit 328 in the example provided above to form the mapped pair.

In some embodiments, the mapping routine 208 iteratively performs the same process at step 1416 with regards to the remaining source lexical units (i.e. the second source lexical unit 314 and the third source lexical unit 316) to map each of the remaining source lexical units to a given target lexical unit, thus creating a plurality of mapped pairs.

Calculating Similarity Parameters

Figure 13:
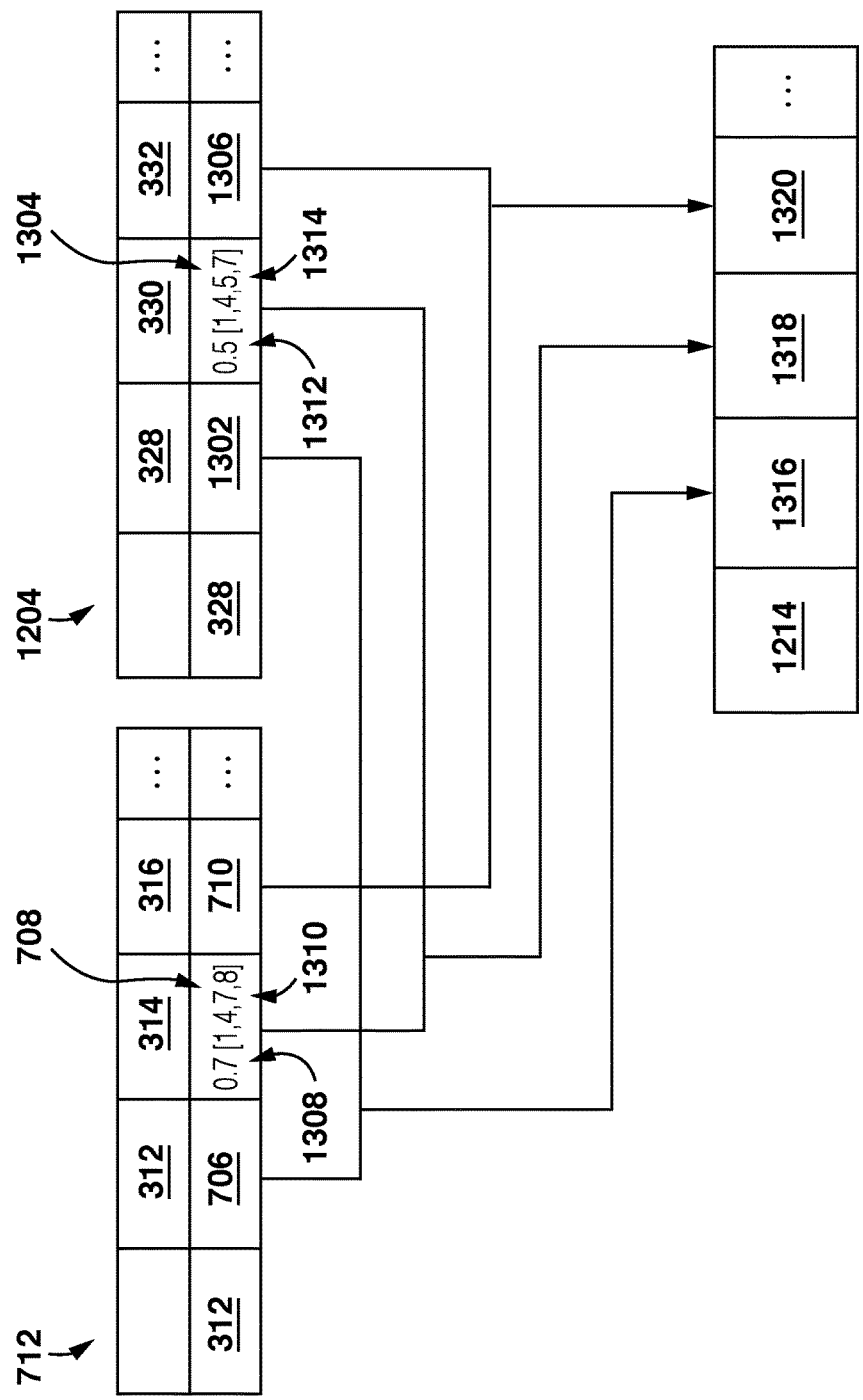
FIG. 13 depicts a schematic illustration of the processes of FIGS. 11 and 14.

FIG. 13 illustrates a non-limiting example of calculating the first similarity parameter 1214 between the first source context parameter 712 and the first target context parameter 1204 in accordance with the first process 1100 and the second process 1400. Although the following explanation is provided only with reference to the first similarity parameter 1214, calculating the remaining similarity parameters can be done by implementing the method described below.

As stated previously, the first source context parameter 712 comprises (i) a first set of source CDR values associated with the first source lexical unit 312, and (ii) an indication of one or more source sentences in which each source lexical unit occurs.

Similar to the first source context parameter 712, the first target context parameter 1204 comprises a first cell 1302, a second cell 1304 and a third cell 1306. Each of the first cell 1302, the second cell 1304 and the third cell 1306 comprises (i) a first set of target CDR values associated with the first target lexical unit 328, and (ii) an indication of one or more target sentences in which each target lexical unit occurs.

In some embodiments of the present technology, the first similarity parameter 1214 is a set of cell similarity parameters comprising a first cell similarity parameter 1316, a second cell similarity parameter 1318 and a third cell similarity parameter 1320.

Each cell similarity parameter (i.e. the first cell similarity parameter 1316, the second cell similarity parameter 1318 and the third cell similarity parameter 1320) is indicative of a similarity between a given cell of the first source context parameter 712 (i.e. the first cell 706, the second cell 708 and the third cell 710) and a given cell of the first target context parameter 1204 (i.e. the first cell 1302, the second cell 1304 and the third cell 1306).

Taking the second cell 708 as an example, the mapping routine 208 is configured to calculate the second cell similarity parameter 1318 as follow. Needless to say, although the following explanation is provided only with reference to the second cell similarity parameter 1316, calculating the remaining cell similarity parameters can be done by implementing the method described below.

The second cell 708 comprises a source CDR value 1308, and a source sentences indication 1310 (which is an indication of the one or more source sentences in which the second source lexical unit 314 is an entry).

The mapping routine 208 is configured to analyze each cells of the first target context parameter 1204 to identify a cell comprising a similar target sentences indication as the source sentences indications.

For example, it may be determined that the second cell 1304 comprises a target sentences indication 1314 (which comprises an indication of the one or more target sentences in which the second target lexical unit 330 is an entry) that is the most similar with the source sentences indication 1310.

Having identified that the second source lexical unit 314 and the second target lexical unit 330 have the highest similarity of sentence occurrence, the mapping routine 208 is configured to calculate the second cell similarity parameter 1318 by comparing a source CDR value 1308 (of the second cell 708) with the target CDR value 1312 (of the second cell 1304).

Validating the Mapped Pairs

In some embodiments of the present technology, each mapped pair is a hypothesis of translation equivalence between the target lexical unit and the source lexical unit associated with the mapped pair. As such, in some embodiments of the present technology, the mapping routine 208 may be configured, as part of the step 1108 and step 1412, to validate the hypothesis for a given mapped pair by comparing the alternate context parameters of the lexical units associated with the given mapped pair.

For example, in a situation where the mapping routine 208 has mapped the first source lexical unit 312 to the first target lexical unit 328, the mapping routine 208 may be configured to calculate the alternate similarity parameter (not depicted) by comparing the first source alternate context parameter 1012 and the first target alternate context parameter (not depicted) using a similar method provided above with regards to FIG. 13.

Briefly returning to FIG. 2, if it is determined that the alternate similarity parameter is higher than an empirically determined threshold, the mapping routine 208 validates the hypothesis and stores the mapped pair as a data packet 214, which can be a mapping database of a dedicated memory space within the server 114. If on the other hand, the alternate similarity parameter is lower than the threshold, the mapping routine 208 invalidates the hypothesis and does not store the mapped pair as the data packet 214.

In the latter case, the mapping routine 208 is configured to identify the second-highest similarity parameter from the set of similarity parameters 1226 or the set of local minimum values 1602. The mapping routine 208 is further configured to consider the target lexical unit associated with the second-highest similarity parameter to be an alternate hypothesis of translation equivalence to the first source lexical unit 312. The mapping routine 208 will then re-execute the process mentioned herein to validate (or invalidate) the alternate hypothesis.

Sentence Aligning Routine

In some embodiments of the present technology, the sentence aligning routine 210 is configured to map each source sentences of the source digital text 302 to a translation equivalent target sentence of the target digital text 318.

Figure 17:
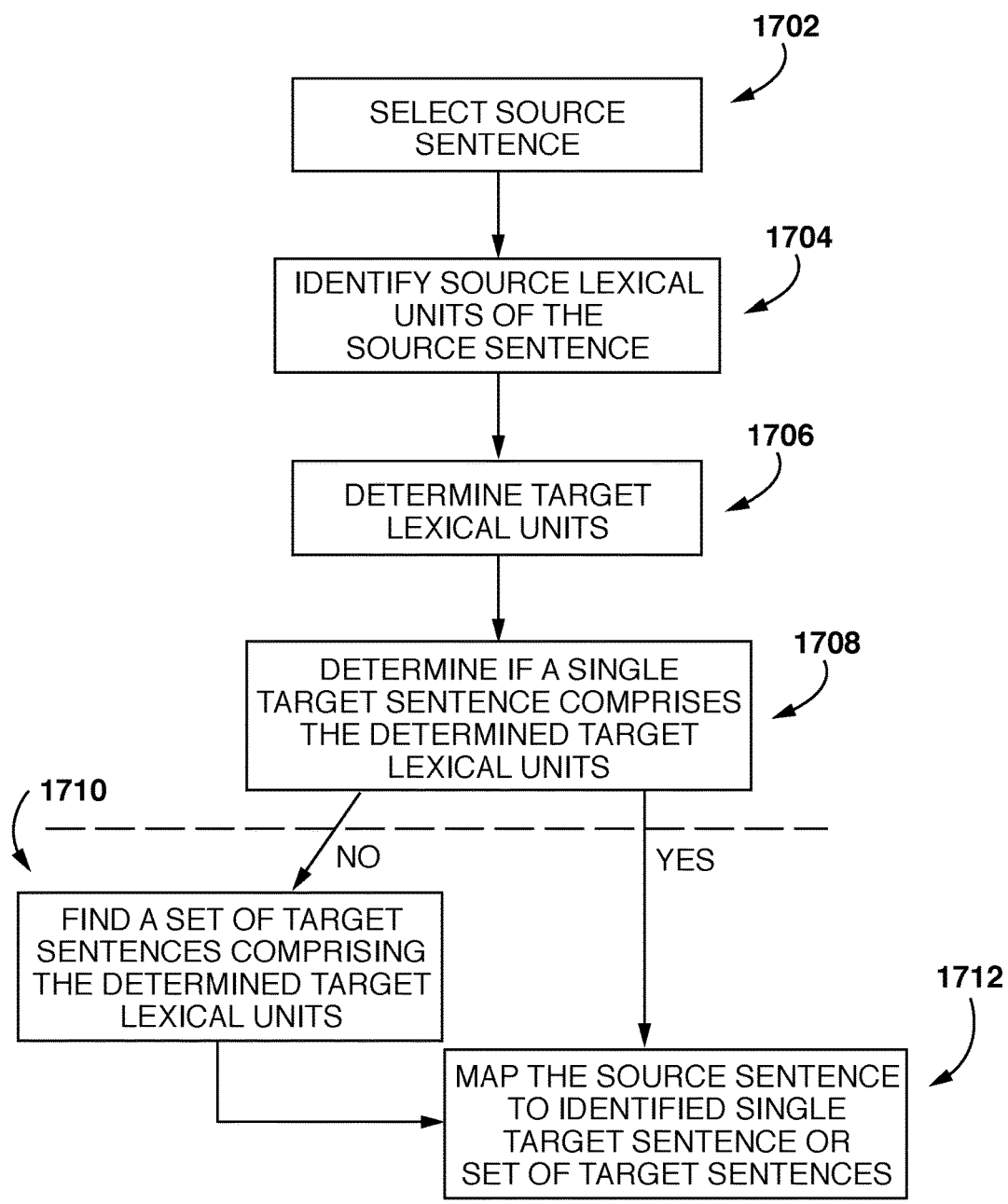
FIG. 17 depicts a flowchart of a process for mapping a source sentence to a target sentence by the mapping application of FIG. 2.

FIG. 17 illustrates an embodiment of a process of mapping a given source sentence to a given target sentence. For ease of explanation, FIG. 17 will be explained with reference to the first source sentence 306.

At step 1702, the sentence aligning routine 210 is configured to select a source sentence from the source digital text 302, such as the first source sentence 306.

At step 1704, the sentence aligning routine 210 is configured to identify the one or more source lexical units comprising the first source sentence 306. For example, it may be determined that the first source sentence 306 comprises the first source lexical unit 312, the second source lexical unit 314 and the third source lexical unit 316.

At step 1706, the sentence aligning routine 210 is configured to access the data packet 214 and determine a set of target lexical units comprising the target lexical units that have been mapped to the first source lexical unit 312, the second source lexical unit 314 and the third source lexical unit 316.

For example, it may be determined that the first source lexical unit 312 is mapped to the first target lexical unit 328, the second source lexical unit 314 to the second target lexical unit 330, and the third source lexical unit 316 to the third target lexical unit 332.

At step 1708, the sentence aligning routine 210 is configured to determine if a single target sentence comprises the first target lexical unit 328, the second target lexical unit 330 and the third target lexical unit 332.

For example, using the indications of the one or more target sentences in which each of the target lexical units occurs (as contained in the first target matrix (not depicted)), the sentence aligning routine 210 is configured to determine the target sentence in which the first target lexical unit 328, the second target lexical unit 330, and the third target lexical unit 332 co-occur, which is, for example the first target sentence 322.

At step 1712, having identified the first target sentence 322 as comprising all the target lexical units mapped to all the source lexical units of the first source sentence 306, the sentence aligning routine 210 is configured to map the first source sentence 306 to the first target sentence 322 as the translation equivalent to form a sentence pair.

As a person skilled in the art would know in the field of machine translation, it often happens that there may be no one-to-one correspondence of sentences between the source digital text 302 and the target digital text 318, therefore it may be determined at step 1708 that there is no single target sentence in which first target lexical unit 328, the second target lexical unit 330, and the third target lexical unit 332 co-occur. Thus, in a situation where the sentence aligning routine 210 is not able to determine a single target sentence comprising the first target lexical unit 328, the second target lexical unit 330, and the third target lexical unit 332, the process proceeds to step 1710 after step 1708.

At step 1710, the sentence aligning routine 210 is configured to identify a given target sentence comprising a subset of the set of target lexical units (such as the first target lexical unit 328, the second target lexical unit 330) and determine if the adjacent sentences to the given target sentence comprises the remaining subset of the set of target lexical units (such as the third target lexical unit 332). Upon identifying that a set of target sentences (i.e. the given sentence and one of the adjacent sentence) comprises the set of target lexical units, the sentence aligning routine 210 is configured to map the set of target sentences to the first source sentence 306 to form a sentence pair at step 1712.

In some embodiments of the present technology, having identified each sentence pairs, the sentence aligning routine 210 is configured to transmit the second data packet 122 to the translation application 104.

In some embodiments of the present technology, the second data packet 122 comprises indications of (i) the source digital text 302 (ii) the target digital text 318 (iii) data indicative of sentence pairs that have been generated, and (iv) machine readable instructions to cause the translation application 104 to align the plurality of source sentences 304 with the plurality of target sentences 320 based on the sentence pairs.

Figure 18:
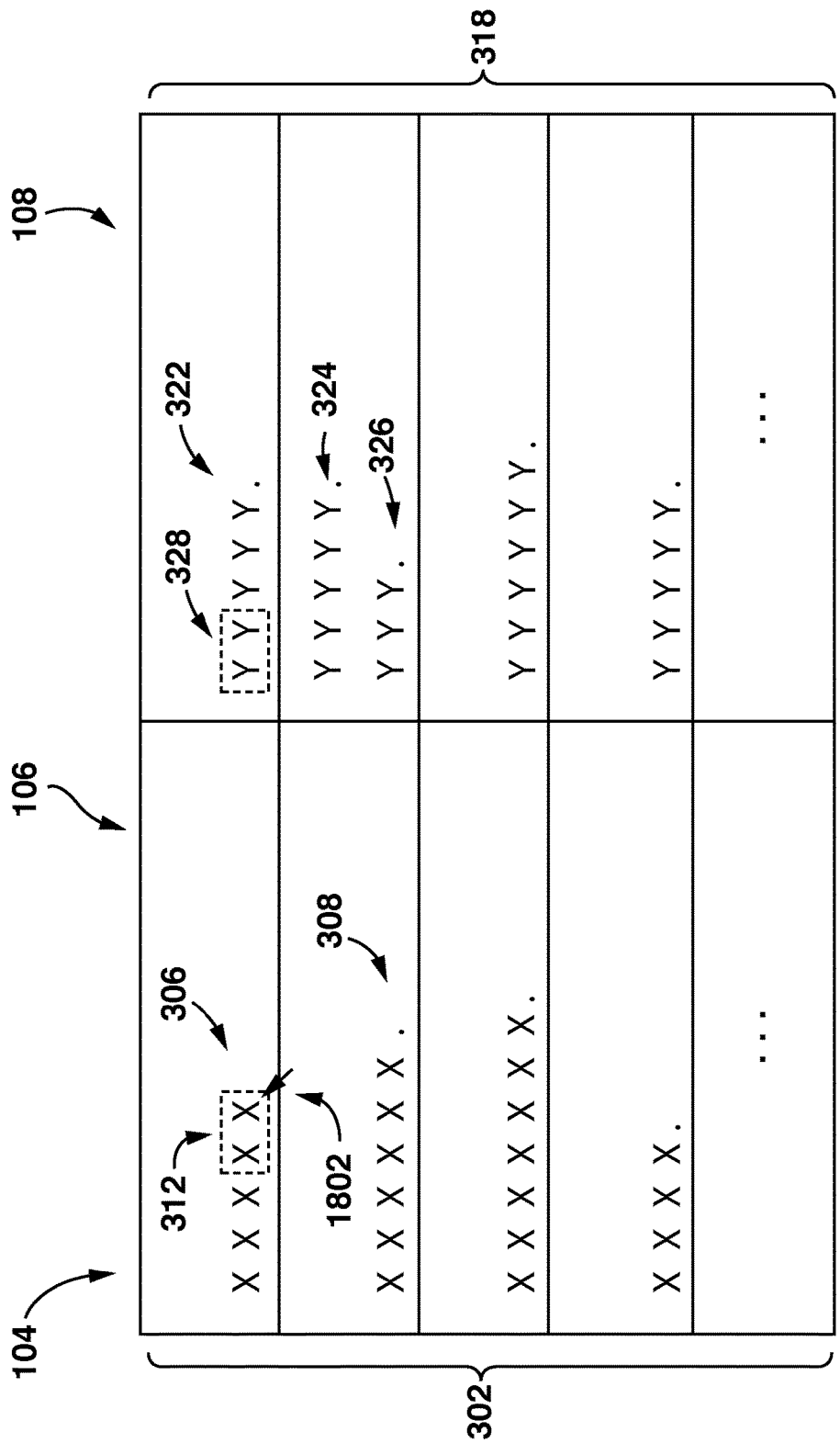
FIG. 18 depicts a schematic illustration of a screenshot showing the source digital text aligned with the target digital text by the translation application of the system of FIG. 1.

FIG. 18 illustrates a screenshot of the translation application 104 in an in-use phase according to embodiments of the present technology. The translation application 104 includes the text entry portion 106 for the source digital text 302 in the first language, which is divided into one or more source sentences by horizontal lines, and the text output portion 108 for the target digital text 318 displaying the aligned one or more target sentences as the corresponding translation equivalent sentence.

In the illustrated embodiment, the first source sentence 306 is aligned with the first target sentence 322. The second source sentence 308 is aligned with both the second target sentence 324 and the third target sentence 326.

In some embodiments of the present technology, the second data packet 122 further comprises (v) data indicative of the mapped pairs, and (vi) machine readable instructions to cause the translation application 104 to indicate the translation equivalent of a given source lexical unit of the source digital text 302 to the target digital text 318 (and vice versa).

For example, upon a cursor 1802 controlled by the user of the electronic device 102 hovers on, or click on, the first source lexical unit 312, the translation application 104 is configured to visually identify the first target lexical unit 328 (which is the determined translation equivalent of the first source lexical unit 312), by highlighting the first target lexical unit 328 within the first target sentence 322.

A specific technical effect of the approach using the embodiments of the present technology is the ability to map a lexical unit of a first language to a lexical unit of a second language as its translation equivalent without the use of dictionaries and solely based on the source digital text 302 and the target digital text 318 (thus, not requiring populating, updating, maintaining and storing of the dictionaries).

Figure 19:
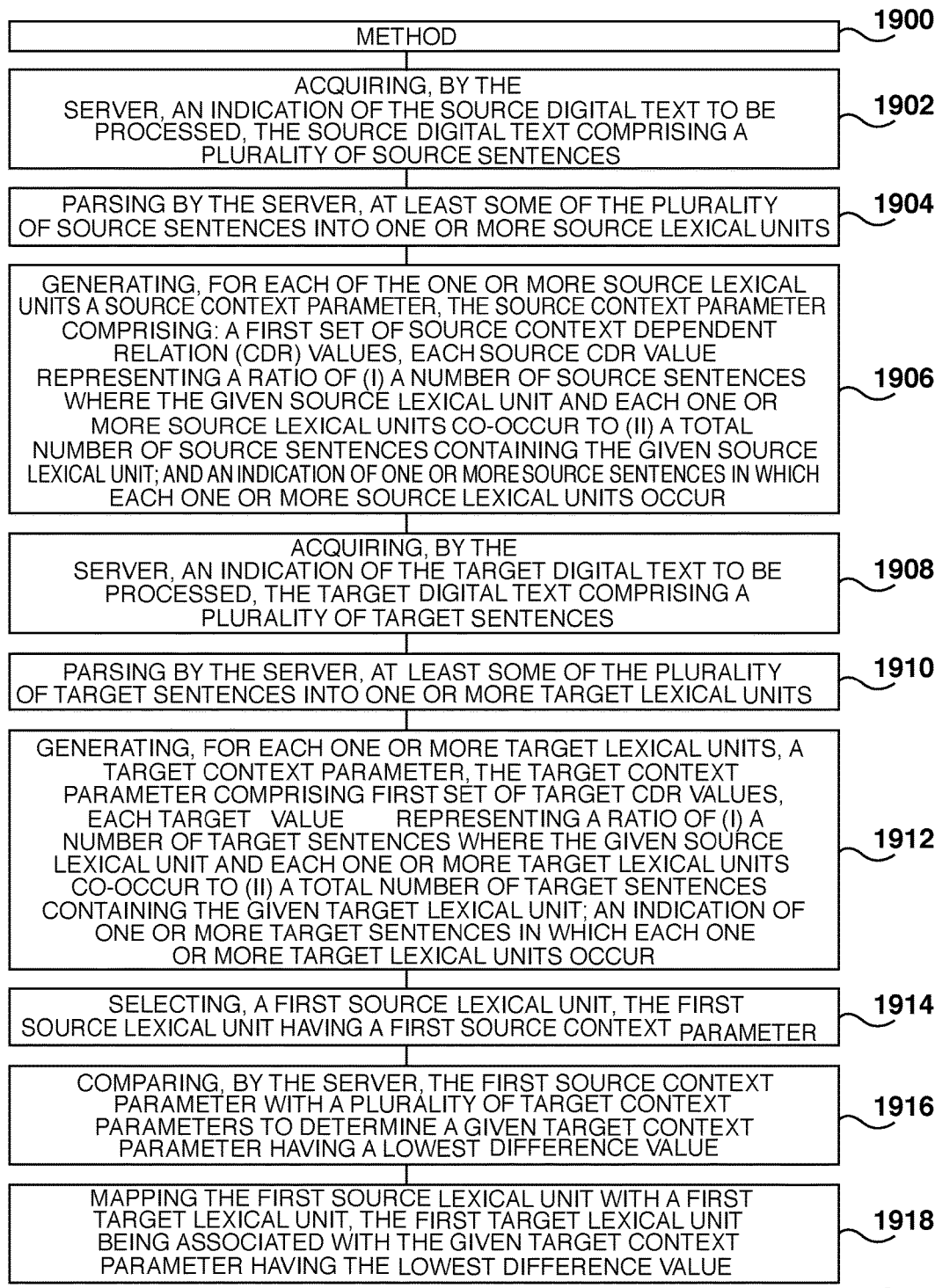
FIG. 19 depicts a flowchart of a method of mapping the source lexical unit to the target lexical unit being executable by the server of FIG. 1, the method being executed in accordance with non-limiting embodiments of the present technology.

Given the architecture and examples provided herein above, it is possible to execute a computer-implemented method of mapping a source lexical unit of the source digital text into a target lexical unit of the target digital text, the second lexical unit being a translation equivalent of the source lexical unit. With reference to FIG. 19, there is depicted a flowchart of a method 1900, the method 1900 being executable in accordance with non-limiting embodiments of the present technology. The method 1900 can be executed by the server 114.

Step 1902—Acquiring, by the Server, an Indication of the Source Digital Text to be Processed, the Source Digital Text Comprising a Plurality of Source Sentences The method 1900 starts at step 1902, where the mapping application 118 executed by the server 114 acquires an indication of the source digital text 302, comprising a plurality of source sentences 304, via the text acquiring routine 202.

In some embodiments, the source digital text 302 is acquired directly from the text processing application 116, or from the digital memory device of the server 114 (not depicted) which stores the source digital text 302.

Step 1904—Parsing by the Server, at Least Some of the Plurality of Source Sentences into One or More Source Lexical Units At step 1904, the parsing routine 204 of the mapping application 118 parses at least some of the plurality of source sentences 304 to select the first source lexical unit 312, the second source lexical unit 314 and the third source lexical unit 316.

Step 1906—Generating, for Each of the One or More Source Lexical Units a Source Context Parameter, the Source Context Parameter Comprising: A First Set of Source Context Dependent Relation (CDR) Values, Each Source CDR Value Representing a Ratio of (i) a Number of Source Sentences where the Given Source Lexical Unit and Each One or More Source Lexical Units Co-Occur to (ii) a Total Number of Source Sentences Containing the Given Source Lexical Unit; and an Indication of One or More Source Sentences in which Each One or More Source Lexical Units Occur At step 1906, the context parameter generating routine 206 of the mapping application 118 is configured to generate a source context parameter for each of the selected source lexical units.

Thus, taking the first source lexical unit 312 as an example, in order to generate the first source context parameter 712, the context parameter generating routine 206 is configured to calculate a set of source CDR values, which represents a ratio of a number of source sentences where the first source lexical unit 312 and each one or more source lexical units (i.e. the second source lexical unit 314 and the third source lexical unit 316) co-occur, to a total number of source sentences containing the first source lexical unit 312. The context parameter generating routine 206 is further configured to identify an indication of one or more source sentences in which each one or more source lexical units (i.e. the first source lexical unit 312, the second source lexical unit 314 and the third source lexical unit 316) occur.

Step 1908—Acquiring, by the Server, an Indication of the Target Digital Text to be Processed, the Target Digital Text Comprising a Plurality of Target Sentences At step 1908, the text acquiring routine 202 of the mapping application 118 acquires an indication of the target digital text 318 which comprises a plurality of target sentences 320.

In some embodiments, the target digital text 318 is acquired directly from the text processing application 116, or from a digital memory device of the server 114 (not depicted) which stores the target digital text 318 generated by the text processing application 116.

Step 1910—Parsing by the Server, at Least Some of the Plurality of Target Sentences into One or More Target Lexical Units At step 1910, the parsing routine 204 of the mapping application 118 parses at least some of the plurality of target sentences 320 to select the first target lexical unit 328, the second target lexical unit 330 and the third target lexical unit 332.

Step 1912—Generating, for Each One or More Target Lexical Units, a Target Context Parameter, the Target Context Parameter Comprising First Set of Target CDR Values, Each Target CDR Value Representing a Ratio of (i) a Number of Target Sentences where the Given Source Lexical Unit and Each One or More Target Lexical Units Co-Occur to (ii) a Total Number of Target Sentences Containing the Given Target Lexical Unit; an Indication of One or More Target Sentences in which Each One or More Target Lexical Units Occur At step 1912, the context parameter generating routine 206 of the mapping application 118 is configured to generate a target context parameter for each of the selected target lexical units.

Thus, taking the first target lexical unit 328 as an example, in order to generate the first target context parameter 1204, the context parameter generating routine 206 is configured to calculate a set of target CDR values, which represents a ratio of a number of target sentences where the first target lexical unit 328 and each one or more target lexical units (i.e. the second target lexical unit 330 and the third target lexical unit 332) co-occur, to a total number of source sentences containing the first target lexical unit 328. The context parameter generating routine 206 is further configured to identify an indication of one or more target sentences in which each one or more target lexical units (i.e. the first target lexical unit 328, the second target lexical unit 330 and the third target lexical unit 332) occur.

Step 1914—Selecting, a First Source Lexical Unit, the First Source Lexical Unit having a First Source Context Parameter At step 1914, the mapping routine 208 of the mapping application 118 is configured to select the first source lexical unit 312, the first source lexical unit 312 having the first source context parameter 712.

Step 1916—Comparing, by the Server, the First Source Context Parameter with a Plurality of Target Context Parameters to Determine a Given Target Context Parameter Having a Lowest Difference Value At step 1916, the mapping routine 208 is configured to compare the first source context parameter 712 with a plurality of target context parameters 1202 (such as the first target context parameter 1204, the second target context parameter 1206 and the third target context parameter 1208) to determine a given target context parameter having a lowest difference value.

Step 1918—Mapping the First Source Lexical Unit with a First Target Lexical Unit, the First Target Lexical Unit being Associated with the Given Target Context Parameter Having the Lowest Difference Value At step 1918, the mapping routine 208 is configured to map the first source lexical unit 312 to the first target lexical unit 328 if it is determined that the first target context parameter 1204 has the lowest difference value.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

The invention claimed is:

1. A computer-implemented method for mapping a source lexical unit of a source digital text in a first language with a corresponding target lexical unit of a target digital text in a second language, the target digital text being a translation of the source digital text, the method executable on a server, the method comprising:
   acquiring, by the server, an indication of the source digital text to be processed, the source digital text comprising a plurality of source sentences;
   parsing by the server, at least some of the plurality of source sentences into one or more source lexical units;
   generating, for each of the one or more source lexical units a source context parameter, the source context parameter comprising:
      a first set of source context dependent relation (CDR) values, each source CDR value representing a ratio of (i) a number of source sentences where the given source lexical unit and each one or more source lexical units co-occur to (ii) a total number of source sentences containing the given source lexical unit; and
      an indication of one or more source sentences in which each one or more source lexical units occur;
   acquiring, by the server, an indication of the target digital text to be processed, the target digital text comprising a plurality of target sentences;
   parsing by the server, at least some of the plurality of target sentences into one or more target lexical units;
   generating, for each one or more target lexical units, a target context parameter, the target context parameter comprising:
      a first set of target CDR values, each target CDR value representing a ratio of (i) a number of target sentences where the given source lexical unit and each one or more target lexical units co-occur to (ii) a total number of target sentences containing the given target lexical unit;
      an indication of one or more target sentences in which each one or more target lexical units occur;
   selecting, a first source lexical unit, the first source lexical unit having a first source context parameter;
   comparing, by the server, the first source context parameter with a plurality of target context parameters to determine a given target context parameter having a lowest difference value; and
   mapping the first source lexical unit with a first target lexical unit, the first target lexical unit being associated with the given target context parameter having the lowest difference value.

2. The computer-implemented method of claim 1, wherein:
   parsing each of the plurality of source sentences and each of the plurality of target sentences comprises assigning a grammatical type to each word of both the source digital text and the target digital text; and
   wherein the lexical unit is one of:
      a word, the word being determined based on its associated grammatical type; and
      a phrase, the phrase being a group of two or more words determined based on the associated grammatical type of one of the two or more words.

3. The computer-implemented method of claim 1, wherein comparing the first source context parameter with a plurality of target context parameters to determine a given target context parameter having a lowest difference value comprises:
   selecting a first source sentence comprising the first source lexical unit;
   for each target sentence of the plurality of target sentences:
      comparing the first source context parameter with the one or more target context parameters associated with the one or more target lexical unit comprising the given target sentence to determine a local minimum value, the local minimum value indicative of a preliminary correspondence of the first source context parameter with the given target context parameter within the given target sentence; and
      based on the determined set of local minimum values, selecting the local minimum value being the lowest difference value.

4. The computer-implemented method of claim 3, wherein the first source lexical unit and the first target lexical unit associated with the lowest difference value is a hypothesis of translation equivalence.

5. The computer-implemented method of claim 4, the method further comprising validating the hypothesis of translation equivalence by:
   generating, for each of the one or more source lexical units, a second set of source context independent relation (CIR) values, each source CIR value representing a ratio of (i) the number of common words between the given source lexical unit and each of the one or more source lexical units to (ii) the number of words of the given source lexical unit;
   generating, for each of the one or more target lexical units, a second set of target CIR values, each target CIR value representing a ratio of (i) the number of common words between the given target lexical unit and each of the one or more target lexical units to (ii) the number of words of the given target lexical unit; and
   determining that the similarity of the set of source CIR values associated with the first source lexical unit to the set of target CIR values associated with the first target lexical unit is above a predetermined threshold.

6. The computer-implemented method of claim 1, further configured to map each source lexical unit with each target lexical unit and storing the mapping in a mapping database.

7. The computer-implemented method of claim 6, wherein upon completion of mapping each source lexical unit to each target lexical unit, the method further comprising mapping the first source sentence to a first target sentence, the first target sentence being a translation equivalent of the first source sentence, by:
- identifying a set of source lexical units comprising the first source sentence;
- acquiring, from the mapping database, a set of target lexical units corresponding to the set of source lexical units; and
- identifying the first target sentence comprising the set of target lexical units.

8. The computer-implemented method of claim 7, wherein upon determination that no target sentence comprises the set of target lexical units, determining a set of target sentences, the set of target sentences comprising two or more adjacent target sentences, comprising the set of target lexical units.

9. The computer-implemented method of claim 1, wherein acquiring the indications of the source digital text and the target digital text comprises acquiring the indications of the source digital text and the target digital text from a dedicated memory device.

10. The computer-implemented method of claim 1, wherein acquiring the indications of the source digital text and the target digital text comprises acquiring the indications of the source digital text and the target digital text from a text processing application, the text processing application having previously generated the target digital text in response to receiving the source digital text from an electronic device.

11. A server for mapping a source lexical unit of a source digital text in a first language with a corresponding target lexical unit of a target digital text in a second language, the target digital text being a translation of the source digital text, the server comprising:
- a network interface for communicatively coupling to a communication network;
- a processor coupled to the network interface, the professor configured to:
  - acquire, by the server, an indication of the source digital text to be processed, the source digital text comprising a plurality of source sentences;
  - parse by the server, at least some of the plurality of source sentences into one or more source lexical units;
  - generate, for each of the one or more source lexical units a source context parameter, the source context parameter comprising:
    - a first set of source context dependent relation (CDR) values, each source CDR value representing a ratio of (i) a number of source sentences where the given source lexical unit and each one or more source lexical units co-occur to (ii) a total number of source sentences containing the given source lexical unit; and
    - an indication of one or more source sentences in which each one or more source lexical units occur;
  - acquire, by the server, an indication of the target digital text to be processed, the target digital text comprising a plurality of target sentences;
  - parse by the server, at least some of the plurality of target sentences into one or more target lexical units;
  - generate, for each one or more target lexical units, a target context parameter, the target context parameter comprising:
    - a first set of target CDR values, each target CDR value representing a ratio of (i) a number of target sentences where the given source lexical unit and each one or more target lexical units co-occur to (ii) a total number of target sentences containing the given target lexical unit;
    - an indication of one or more target sentences in which each one or more target lexical units occur;
  - select, a first source lexical unit, the first source lexical unit having a first source context parameter;
  - compare, by the server, the first source context parameter with a plurality of target context parameters to determine a given target context parameter having a lowest difference value; and
  - map the first source lexical unit with a first target lexical unit, the first target lexical unit being associated with the given target context parameter having the lowest difference value.

12. The server of claim 11, wherein:
parsing each of the plurality of source sentences and each of the plurality of target sentences comprises assigning a grammatical type to each word of both the source digital text and the target digital text; and
wherein the lexical unit is one of:
- a word, the word being determined based on its associated grammatical type; and
- a phrase, the phrase being a group of two or more words determined based on the associated grammatical type of one of the two or more words.

13. The server of claim 11, wherein comparing the first source context parameter with a plurality of target context parameters to determine a given target context parameter having a lowest difference value comprises:
- select a first source sentence comprising the first source lexical unit;
- for each target sentence of the plurality of target sentences:
  - compare the first source context parameter with the one or more target context parameters associated with the one or more target lexical unit comprising the given target sentence to determine a local minimum value, the local minimum value indicative of a preliminary correspondence of the first source context parameter with the given target context parameter within the given target sentence; and
- based on the determined set of local minimum values, selecting the local minimum value being the lowest difference value.

14. The server of claim 13, wherein the first source lexical unit and the first target lexical unit associated with the lowest difference value is a hypothesis of translation equivalence.

15. The server of claim 14, the processor further configured to validate the hypothesis of translation by:
- generate, for each of the one or more source lexical units, a second set of source context independent relation (CIR) values, each source CIR value representing a ratio of (i) the number of common words between the given source lexical unit and each of the one or more source lexical units to (ii) the number of words of the given source lexical unit;
- generate, for each of the one or more target lexical units, a second set of target CIR values, each target CIR value representing a ratio of (i) the number of common words between the given target lexical unit and each of the one or more target lexical units to (ii) the number of words of the given target lexical unit; and determine that the similarity of the set of source CIR values associated with the first source lexical unit to the set of target CIR values associated with the first target lexical unit is above a predetermined threshold.

16. The server of claim 11, the processor further configured to map each source lexical unit with each target lexical unit and storing the mapping in a mapping database.

17. The server of claim 16, wherein upon completion of mapping each source lexical unit to each target lexical unit, the processor further configured to map the first source sentence to a first target sentence, the first target sentence being a translation equivalent of the first source sentence, by:
   identifying a set of source lexical units comprising the first source sentence;
   acquiring, from the mapping database, a set of target lexical units corresponding to the set of source lexical units; and
   identifying the first target sentence comprising the set of target lexical units.

18. The server of claim 17, wherein upon determination that no target sentence comprises the set of target lexical units, determine a set of target sentences, the set of target sentences comprising two or more adjacent target sentences, comprising the set of target lexical units.

19. The server of claim 11, wherein the indications of the source digital text and the target digital text are acquired from a dedicated memory device.

20. The server of claim 11, wherein the indications of the source digital text and the target digital text are acquired from a text processing application, the text processing application having previously generated target digital text in response to receiving the source digital text from an electronic device.

* * * * *